(12) United States Patent
Diamandis et al.

(10) Patent No.: US 7,287,722 B2
(45) Date of Patent: Oct. 30, 2007

(54) ROCKET-POWERED VEHICLE RACING COMPETITION

(75) Inventors: Peter H. Diamandis, Santa Monica, CA (US); Granger B. Whitelaw, Red Bank, NJ (US); Michael R. D'Angelo, Melrose, MA (US)

(73) Assignee: Rocket Racing, Inc., New York, NY (US)

( * ) Notice: Subject to any disclaimer, the term of this patent is extended or adjusted under 35 U.S.C. 154(b) by 0 days.

(21) Appl. No.: 11/240,638

(22) Filed: Oct. 3, 2005

(65) Prior Publication Data

US 2007/0221785 A1 Sep. 27, 2007

(51) Int. Cl.
*B64D 45/00* (2006.01)
(52) U.S. Cl. .................................................. 244/1 R
(58) Field of Classification Search ................ 244/1 R, 244/53 R, 62; 463/16–17, 9, 25, 40–42; 273/139, 236–7, 269, 292–3, 440–1, 445, 273/459–61
See application file for complete search history.

(56) References Cited

U.S. PATENT DOCUMENTS

| | | | | |
|---|---|---|---|---|
| 5,714,997 | A * | 2/1998 | Anderson | 348/39 |
| 6,080,063 | A * | 6/2000 | Khosla | 463/42 |
| 6,089,981 | A * | 7/2000 | Brenner et al. | 463/40 |
| 2003/0078087 | A1 * | 4/2003 | Kojima et al. | 463/6 |

OTHER PUBLICATIONS

Robert C. Cowen, "X Prize Aims to Boost Civilian Spaceflight," *The Christian Science Monitor*, Jul. 2, 1996.
James Brooke, "Ambitious Entrepreneurs Planning to Send Tourist Into 'Astronaut Altitude.'", *The New York Times*, Feb. 17, 1998.
"History of the X Prize Foundation", www.xprize.org/about/our_history.php, printed Aug.11, 2004.

\* cited by examiner

*Primary Examiner*—Stephen A Holzen
(74) *Attorney, Agent, or Firm*—Deborah A. Peacock; Peacock Myers, P.C.

(57) ABSTRACT

A method for racing rocket-powered vehicles directly against one another is provided in which a first rocket-powered vehicle simultaneously races against a second rocket-powered vehicle to be the first to complete a race course. The method may include the first and second rocket-powered vehicles performing a pre-determined maneuver while proximate a group of spectators, and/or the rocket-powered vehicles strategically performing the steps of gliding and boosting the flight of their rocket-powered vehicle in accordance with a pre-determined maximum fuel criteria. The method further may include permitting spectator interaction with participants of the racing competition and enabling spectators to compete with actual participants via virtual vehicles. The method may also include the rocket-powered vehicles performing a refueling operation. The method may further include providing audible or visual identifiers of the vehicles. In addition, the method may include providing safety data to ensure safe separation between competing vehicles.

21 Claims, 24 Drawing Sheets

ROCKET-POWERED VEHICLE RACING COMPETITION

CROSS-REFERENCE TO RELATED CASES

This application is related in subject matter to commonly-owned U.S. patent application Ser. No. 10/843,297 entitled "Spaceship Competition" filed on May 12, 2004.

TECHNICAL FIELD

This invention relates generally to racing competitions. More particularly, the invention relates to rocket-powered vehicle racing competitions including racing methods, rocket-powered vehicles, spaceports, methods of observer interaction and virtual participation in a rocket-powered vehicle racing competition, and related apparatus.

BACKGROUND

Car racing is a well-established industry with such variants as the INDIANAPOLIS 500 races, NASCAR races and FORMULA-1 races. These racing competitions include a pre-specified car design, a specially designed track and direct viewing of the race by the general public in a stadium setting. Automobile races have been extremely successful in attracting very large corporate sponsorship and significant revenue from broadcast rights. These races have also lead to significant breakthroughs in automotive design and performance. Car racing, however, appeals to a limited audience that primarily includes race enthusiasts.

Yacht racing is also is a well-established industry with variants such as the LOUIS VUITTON AMERICA'S CUP competition. Similar to car racing, yacht racing competitions involve a pre-specified yacht design, a specially designed track and direct observation by the general public. Yacht races have also been extremely successful in attracting corporate sponsorship and significant revenue from broadcast rights, and have lead to significant breakthroughs in boating design and performance.

Manned rocket launches have traditionally been high visibility events that garner tremendous public interest beyond enthusiast groups, but which have never attracted significant sponsorships or media/broadcast rights. This is because rocket launches typically cannot be 'scheduled', as their actual launch time and date depend on when the payload and rocket are ready for deployment, and on weather conditions. Launch delays are commonplace and lead to great difficulty when scheduling network broadcast time. Networks may only pay for the broadcast of events that they know may occur as scheduled (e.g., football games, Olympic events, etc.). With regard to sponsorships, sponsors enjoy regularity and repeatability in the events that they sponsor (e.g., car races, golf classics, etc.). They also enjoy standardization in the event and in the location of their logos on the hardware or participants. They may require that the events have network coverage in order to extend the value of their sponsorship dollars to millions of eyeballs worldwide. Further, they desire that the events involve people (e.g., heroes) that participate in the events, which can make the launch of satellites by unmanned rockets uninteresting and inconsequential to the public.

Unfortunately, conventional manned rockets have been government owned and operated (e.g., the U.S. Space Shuttle and the Russian Soyuz), which do not actively market sponsorships. To promote the development and flight of rocket-powered vehicles able to provide low-cost commercial transport of humans into space outside of government sponsorship, the non-profit X PRIZE foundation has established the X PRIZE COMPETITION. The X PRIZE COMPETITION is a competition with a US $10,000,000 prize directed to jump starting the space tourism industry through competition between the most talented entrepreneurs and rocket experts in the world. The $10 million cash prize was awarded on Oct. 4, 2004 to Mojave Aerospace Ventures for being the first team that privately financed, built & launched a rocket-powered vehicle able to carry three people to 100 kilometers (62.5 miles), returned the rocket-powered vehicle safely to Earth, and repeated the launch with the same vehicle within 2 weeks.

FIG. 1 illustrates the X PRIZE COMPETITION. As shown, the winning team launches a manned rocket-powered vehicle 2 to an altitude greater than 100 km twice within a two-week period. Rocket-powered vehicle 2 may be launched at a location and a time of the respective team's choosing. The competition is a "first to accomplish" competition, in which the winning team is the first one to accomplish the established criteria. Although the X PRIZE COMPETITION is an excellent introduction into the realm of privately owned rocket-powered vehicles, it does not lend itself to public involvement in a competition atmosphere and to the marketing interest of other competitions, such as car racing and yacht racing competitions.

SUMMARY

Aspects of the present invention provide a method for racing rocket-powered vehicles directly against one another, in which a first rocket-powered vehicle simultaneously races against a second rocket-powered vehicle to complete a pre-determined course. The method may include the first and second rocket-powered vehicles performing a pre-determined maneuver while proximate a group of spectators, and/or the rocket-powered vehicles strategically performing the steps of accelerating, gliding and boosting rocket-powered vehicle flight in accordance with pre-determined maximum fuel, maximum engine burn time, and/or maximum thrust parameters for the racing participants.

Aspects of the invention further provide a spaceport for supporting a rocket-powered vehicle racing competition, providing spectator observation of the racing competition, and/or providing spectator interaction with participants of the racing competition. The spaceport may include rapid refueling stations for rapidly refueling participant rocket-powered vehicles during racing pit stops, one or more displays showing the racing competition to spectators in real-time, an spectator interactivity server for permitting spectators to interact with racing participants, and/or a gaming server to permit spectators to virtually compete against racing participants.

In addition, aspects of the invention provide a rocket-powered vehicle having selectively applied primary and secondary rocket engines for strategically accelerating, gliding and boosting rocket-powered vehicle flight in accordance with pre-determined maximum fuel, maximum engine burn time, and/or maximum thrust parameters for the racing participants. Other aspects of the invention provide a rocket-powered vehicle having identification features including audible and/or visual signatures. Yet other aspects of the invention provide a rocket-powered vehicle having a control console displaying three-dimensional virtual racecourse information, which may also display real-time, physical views along with the virtual racecourse information.

Other features and advantages of various aspects of the invention may become apparent with reference to the following detailed description and figures.

BRIEF DESCRIPTION OF THE DRAWINGS

The invention may be described in detail in the following description of preferred embodiments with reference to the following figures wherein.

DETAILED DESCRIPTION

The various aspects of the invention may be embodied in various forms. The following description shows by way of illustration various embodiments in which aspects of the invention may be practiced. It is understood that other embodiments may be utilized and structural and functional modifications may be made without departing from the scope of the present invention.

Example Rocket-Powered Vehicle Competition

Figure 1:
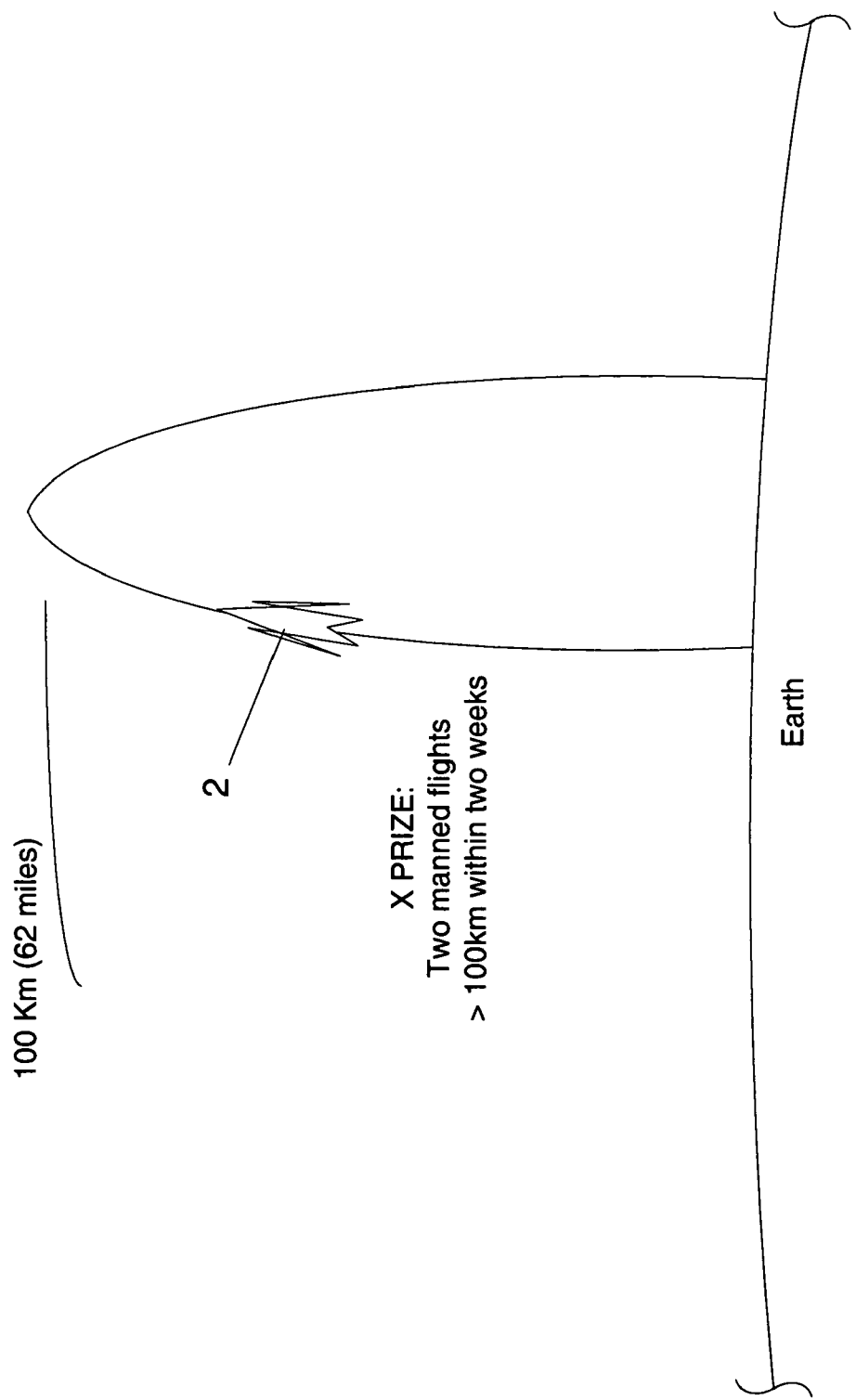
FIG. 1 illustrates a prior art rocket-powered vehicle competition.
Figure 2:
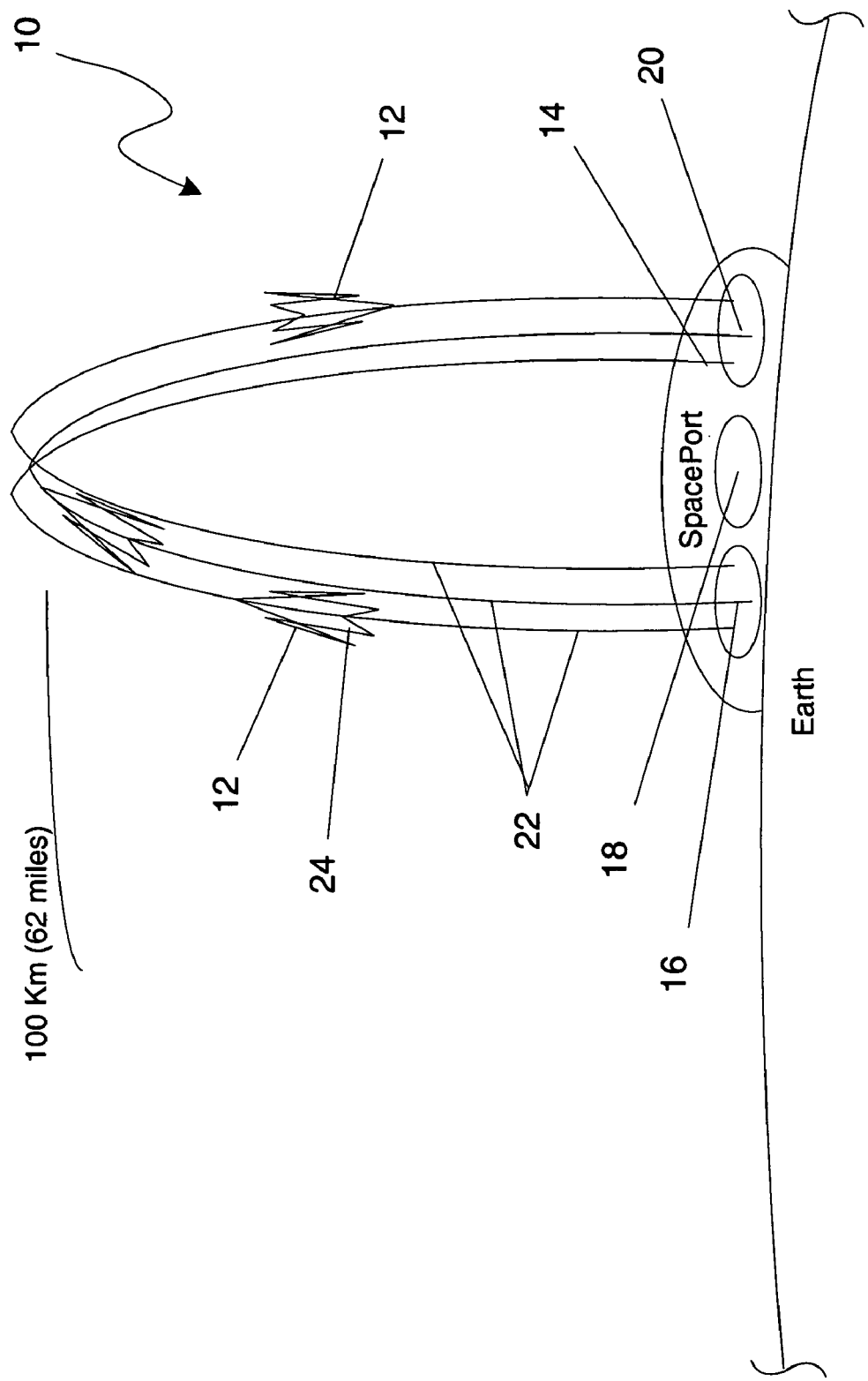
FIG. 2 illustrates a rocket-powered vehicle competition according to an embodiment of the invention.
Figure 3:
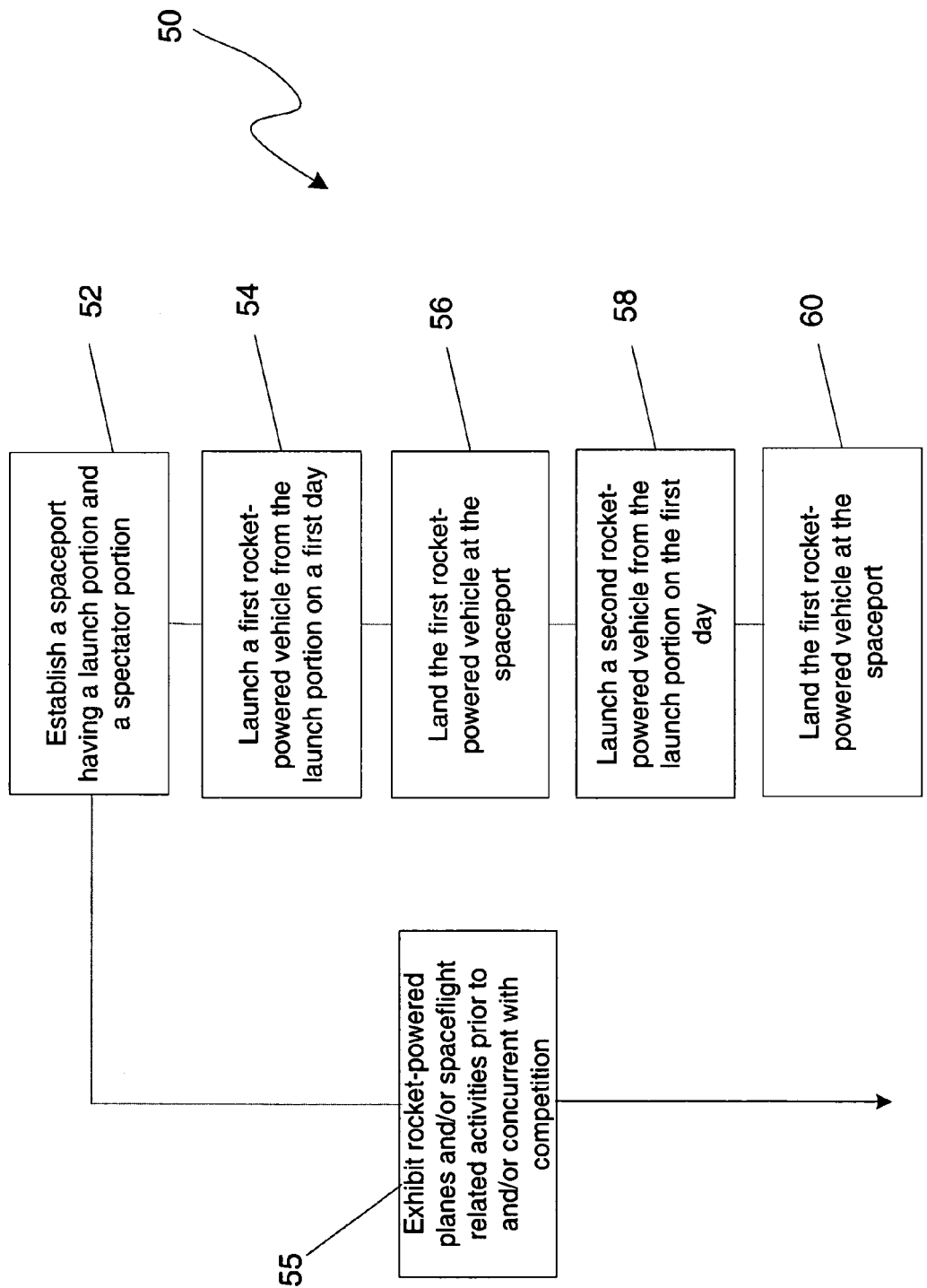
FIG. 3 shows a method for racing rocket-powered vehicles in the rocket-powered vehicle competition of FIG. 2.

Referring now to FIGS. 2 and 3, a rocket-powered vehicle competition 10 and a method 50 for racing rocket-powered vehicles is generally shown according to an embodiment of the invention. As shown in FIG. 2, rocket-powered vehicle competition 10 generally includes rocket-powered vehicles 12 and a spaceport 14 having a launch portion 16, a spectator portion 18 and a landing zone 20. During competition with each other, rocket-powered vehicles 12 follow flight paths 22, which may include generally parabolic trajectories or other trajectories as appropriate.

Rocket-powered vehicle competition 10 may involve racing two or more rocket-powered vehicles 12. FIG. 3 shows a method 50 for racing rocket-powered vehicles that may occur as part of rocket-powered vehicle competition 10. The term "racing" as used herein refers to a plurality of rocket-powered vehicles or teams competing according to pre-determined criteria. Method 50 generally includes establishing 52 spaceport 14, which includes launch portion 16, spectator portion 18 and landing zone 20, and landing and launching rocket-powered vehicles 12. Rocket-powered vehicles 12 race by competing with one another according to the pre-determined criteria. Depending on the criteria, the competitions may not be simultaneous. For example, a first one of rocket-powered vehicles 12 may complete its flight path 22 in a first measured period, and a second one of rocket-powered vehicles 14 may subsequently complete its flight path 22 in a second measured period that is faster than the first measured period of its competitor. If the pre-determined criterion is the elapsed time to complete a pre-determined flight path, the second one of rocket-powered vehicles 12 could be the winner in this example.

The flight path preferably includes a three-dimension path having a significant vertical component.

The rocket-powered vehicle competition of method 50 includes at least two rocket-powered vehicles launching and landing from spaceport 14 within view of spectator portion 18 in a single day. As such, a first one of rocket-powered vehicles 12 launches 54 from launch portion 16 on a first day and subsequently lands 56 at landing zone 20. The steps of launching 54 and landing 56 may occur on the same day or on separate days. Further, launch portion 16 and landing zone 20 may be a single launch and landing area, such as a launch pad. On the same day that the first one of rocket-powered vehicles 12 launches, a second one launches 58 from launch portion 16 and subsequently lands 60 at landing zone 20. Rocket-powered vehicles 12 may launch and land at one or more launch sites and landing zones.

The following is one scenario for practicing rocket-powered vehicle competition 10 and method 50 according to an embodiment of the invention. The competition may occur as an annual event occurring at a single licensed spaceport 18, but it may also occur at other intervals and at a plurality of licensed spaceports. Winners of the competition may be presented with cash awards and a trophy, which is to be held by the winning team until the next competition. A panel of judges (not shown) may oversee the competition to make sure the rules of the competition are being upheld by participants.

The panel of judges (not shown) may be in charge of scoring during the event. The panel of judges may authorize teams 24 associated with one or more rocket-powered vehicles 12 to enroll in the competition based on certain pre-determined criteria discussed later. Each team 24 may have one or more rocket-powered vehicles 12 and associated crewmembers (not shown) with which to perform racing activities.

The panel of judges (not shown) may include an odd number of independent judges, and the total number of judges each year may be twice the number of teams registered plus one as the chief judge. The chief judge oversees and coordinates the activities of the judges and reports the results. Any decision rendered by not less than two thirds of the judges may be final and binding on the teams. The timing of the appointment of judges may be 60 days before the first launching day of the competition.

The judges may monitor all flight attempts and vehicles during the competition, and the teams should agree to cooperate fully with the judges in monitoring flight attempts and competition requirements. Any challenge to a judge's independence or impartiality is deemed waived by the parties if not made timely and prior to 30 days of the event. The judges should be unbiased and not belong or be affiliated with any of the competing teams.

The panel of judges may be in charge of taking necessary measurements during the competition in order to evaluate each team's progress. If a team wishes to make an appeal of a decision made by the judges, they may fill out a redress form within one hour of that decision. A hearing may be held for the requests one hour after the landing of the last launch of that day.

The following describes one possible set of rules for the competition. In accordance therewith, each flight of the competition should carry at least three people, and each rocket-powered vehicle should be built with the capacity to safely carry a minimum of three persons, each of a height of at least 188 centimeters and weighing at least 90 kilograms. In the event that a rocket-powered vehicle flies with fewer than three persons, equivalent ballast (passenger and required life support, e.g. pressure suit) may be carried in-flight to bring the total passenger payload mass to the required minimum mass. To encourage safety on the flights, teams may credit the mass of ejection seats or other crew escape systems against the required payload capacity.

For this scenario, each flight should reach a minimum altitude of 100 kilometers above mean sea level. In other scenarios, competition flights may occur at other altitudes, such as about 5 kilometers to 25 kilometers above mean sea level or more. Each team should be responsible for providing the judges (not shown) and mission control (not shown) with information that may allow the rocket-powered vehicle to be properly tracked to verify the altitude achieved by the vehicle. Methods for tracking rocket-powered vehicles are discussed later along with FIGS. 6-8.

In any flight attempt, no more than 10% of a rocket-powered vehicle's non-propellant mass may be replaced between the two consecutive flights. For multi-stage vehicles, the 10% figure applies to the combined stages. The vehicle may return from both flights substantially intact, as determined by and in the sole judgment of the judges, such that the vehicle is reusable.

All stages of each team's rocket-powered vehicle should return and safely land within landing zone. Failure to do so may result in the respective team's disqualification from the flight. Further, the flight should not be counted and the running clock for "turn around" will not be stopped unless the team abandons that attempt and requests a new Launch Slot.

Each team should accomplish a minimum of two flights (as determined above) throughout the entire competition to be officially entered in the category scoring and overall scoring.

During the competition, each team may be allocated a specific GMT time to start their launch until they have landed, which constitutes a launch slot. The Launch Slot duration is the shorter of two hours or until the rocket-powered vehicle has landed. During this launch slot, no other team can launch. A rocket-powered vehicle is deemed to have landed when all components of the rocket-powered vehicle comes to rest. Each team may be provided with a specified area within landing zone within which the rocket-powered vehicle is required to land. For a horizontal landing vehicle, this is a specific runway. For a vertical landing vehicle, this is a region of land or water.

As discussed later along with FIGS. 4 and 5, the landing zone location and size are selected to allow for public viewing while also allowing for sufficient public safety. Each specified landing zone area may contain a landing target area 78 (see FIG. 5A) and overshoot areas 80. For purposes of measuring landing accuracy, a horizontal vehicle's main-gear touchdown point may be measured from the landing target (e.g., center of landing target area 78). For a vertical landing ship, the distance of the final resting point of the ship from the landing target may be measured. Landing accuracy may be measured with the manned sub-orbital stage of rocket-powered vehicle 12; however, all other stages may land in the specified area of the landing zone 20.

For the present embodiment of competition 10, the terms "vehicle," "ship," or "rocket-powered vehicle" refers to all stages or parts of the launch system (e.g., tow vehicles, balloons, descent chutes, etc.). Exemplary rocket-powered vehicles 12 are described later along with FIG. 6.

There may be 28 days in an example daily schedule for the competition with 14 of those days being launch days (e.g., days 11-24) for actual competition. There may be six launch slots every two hours of each launch day of the competition's 14 days totaling a minimum of 84 during the competition. The launch slots may commence at 8 a.m. local time (8 am, 10 am, 12 pm, 2 pm, 4 pm, and 6 pm).

Five days before the launches start, a draw may decide an order for teams to select launch slots and immediately following there may be a draft pick for all 84 slots. The 84 slots are effectively a launching order. The teams own the launch slot numbers they choose in the draft pick but the precise time can be changed if a judge calls a delay. Each team may be given 72 hours, starting from the beginning of the draft pick, to trade slots.

Included in each team's registration information may be both the expected and the longest launch time interval for their rocket-powered vehicle. These times may grant the possibility of obtaining an advanced launch time.

If a team finishes their launch attempt with time remaining in the two-hour period, the next team in the order of launching can request to launch. This second team can launch if their pre-submitted materials prove that they can accomplish the launch before the end of that 2-hour window. If the next team is not interested in an advanced launch, the next team after them may have the same opportunity. The order of opportunity is the same as the launch slot order. If a subsequent team does launch, then their launch slot becomes vacant and the team with the next launch slot has the right of first decision to whether they want to advance their slot.

In the event that a delay is called by the judges, which causes the launches to be postponed over night, any rocket-powered vehicle competing in Category 1: Turn Around Time (described below), may be quarantined to prevent adjustments and the clock may be "paused" immediately for those teams Only in the situation where a delay has caused a team to have multiple launch slots on a single day and that team does not to wish to fly in this many slots, can that team submit a request to trade launch slots with another team or withdraw their slot and be put on a waiting list for advanced launches. If an advance launch opportunity does not arise, that team which failed to trade their launch may not be given additional time after the 84 slots.

The schedule may include "Reserve Days," which can compensate for potential delays. The judges have the right to decide a fair end of the competition if many delays have occurred and not all 84 slots can be used. This decision may be based upon an equal number of attempts, not successful flights, by the teams.

Before being registered for the competition, each team should prove that they are capable of flying their rocket-powered vehicle to a minimum altitude of 100 kilometers with a minimum crew size of three people and should re-fly the same vehicle within two weeks. These Qualification Flights may be done within six months of the competition. Each team may be allowed to enter the competition with two identical vehicles. However, only one vehicle may be used in the qualifying flight if information is submitted proving that the second is identical. The second ship may only be used if the first ship is deemed to be disqualified incapacitated, in which case it cannot be used again in the competition.

Every competing team may be scored in the following five categories. They may make as many flight attempts as possible during the length of the competition and within the guidelines of the competition.

Category 1 entitled "Turn Around Time" is the fastest time from first take-off (deemed as the start of the assigned Launch Slot) to the rocket-powered vehicle 12 landing in landing zone 20 on their second successful flight. These two successful flights need not be consecutive. Both flights should carry a minimum of three people and reach a minimum of 100 km. Only one vehicle, however, can be used to win this category. If a team uses a new vehicle 12, then the clock restarts for Category 1.

Category 2 entitled "Max PAX" is the largest number of crew carried to a minimum of 100 km altitude on a single flight. Category 3 entitled "Total PAX" is the largest number of crew carried by a same vehicle to a minimum of 100 km during entire period of the competition. If both ships are used during the competition, for scoring in Category 3, Max PAX, the crew totals are not combined and the team's results may be taken from the higher total of the two ships.

Category 4 entitled "Max Altitude" is the highest altitude reached during a single flight carrying a minimum of 3 crewmembers. Category 5 entitled "Fastest Flight Time" is the fastest time from first take-off (deemed as the start of the assigned Launch Slot) to the rocket-powered vehicle 12 landing in landing zone 20 on their first successful flight. The flight may carry a minimum of three people and reach a minimum of 100 km. For any flight to count for a category, the crew should return to the Earth's surface in good health according to the definition set forth by the Federation Aéronautique Internationale.

The competition may be scored using a low point scoring system. The finishing position in each category may be the team's point score (for example, $1^{st}$ place receives 1 point and $4^{th}$ place receives 4 points). The team with the lowest combined point score from all the categories is the competition Champion.

If a team fails to complete the minimum of two flights during the competition, that team may be scored as "DNC" for "Did Not Complete" and their point score for all categories may be the total number of competitors for the entire competition plus one (if there are five teams that are competing the team that scores a DNC may receive 6 points in each category totally 30 points total). This is to recognize the fact that a team went through the proper pre-qualifications and application procedures and to recognize their involvement in the competition.

For each of the five categories the same tiebreaking procedure may be followed. If two or more teams are tied in a category, the team that demonstrates the closest landing to the center of landing target 78 (see FIG. 5A) may be the tiebreaker winner. In case of multiple teams acquiring the same target score, the winner may be the team that performs this task the most. If the teams have landed the exact same amount of times and the same accuracy, the finishing position of the team in that category may remain tied.

If there is a tie for the overall competition, the teams in question may have their scores compared in the following manner: The team with the most first place finishes may become the competition Champion. If the amount of firsts is the same then it may go the number of second place finishes, followed by third and so on.

In the event that two or more teams have the exact same results from all of the categories, the target accuracy performance from throughout the competition may be compared. Closest finisher to the target bull's-eye wins the target accuracy performance criteria. If the tied teams all acquired the bull's-eye, then the total number of successful flights to the bull's-eye judges the target performance. If the teams have the exact same target performance in the competition, the competition may be awarded to the tied teams, the prize may be shared and the trophy may be time-shared.

For tiebreaker purposes, the landing accuracy record may be each team's complete efforts with both ships for Categories 2, 4 and 5 only. The landing accuracy record for Category 1 and 3 may be chosen by each team for the ship they want to be scored.

Judges may postpone launches due to weather conditions, accidents or hazardous situations at their discretion. Judges may declare the duration of postponement within 5 minutes. The Judges may provide an update half way through the postponement with an option to end the postponement or declare an extension.

In advance of the competition, all teams may submit the weather condition restrictions of their vehicles they deem safe and unsafe to launch. A team can petition the judges for a launch delay due to weather, however, the judges may base their decision on the weather conditions submitted in advance by the team.

Example Rocket-Powered Vehicle

Figure 6:
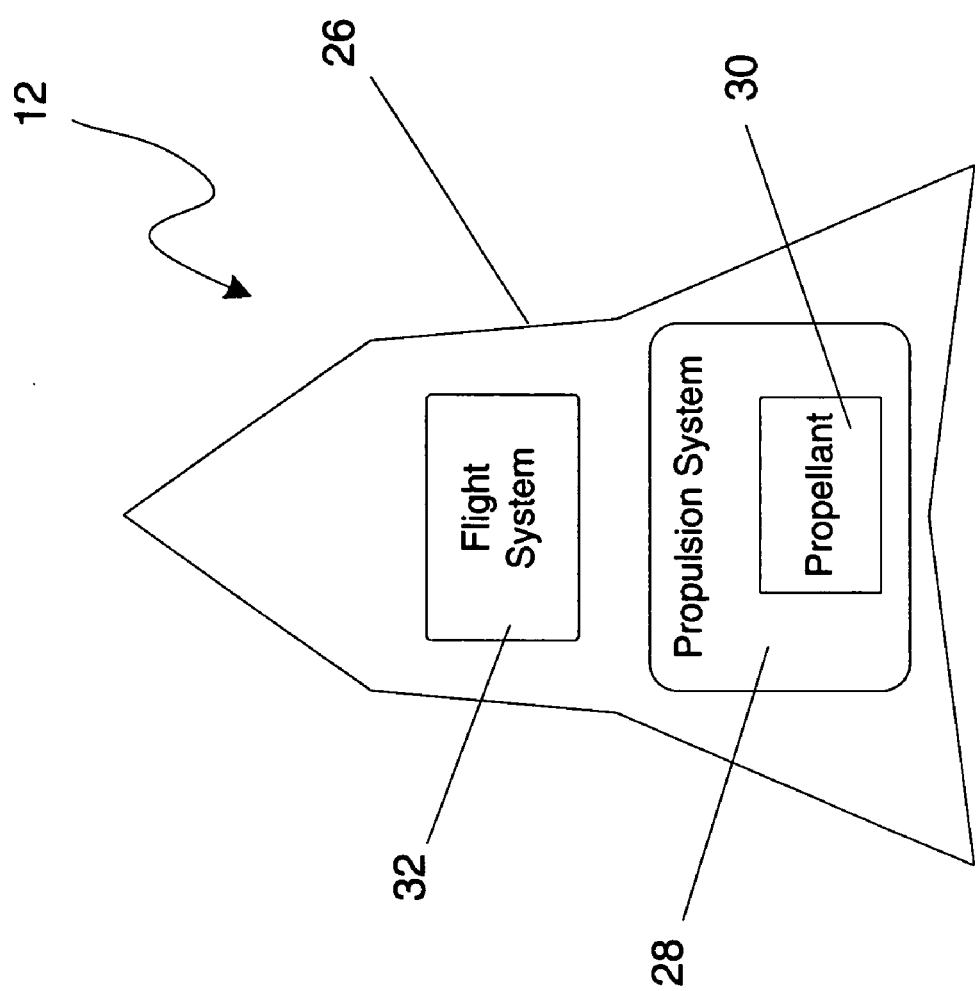
FIG. 6 shows a rocket-powered vehicle according to an embodiment of the invention for use with the rocket-powered vehicle competition of FIG. 2.
Figure 8:
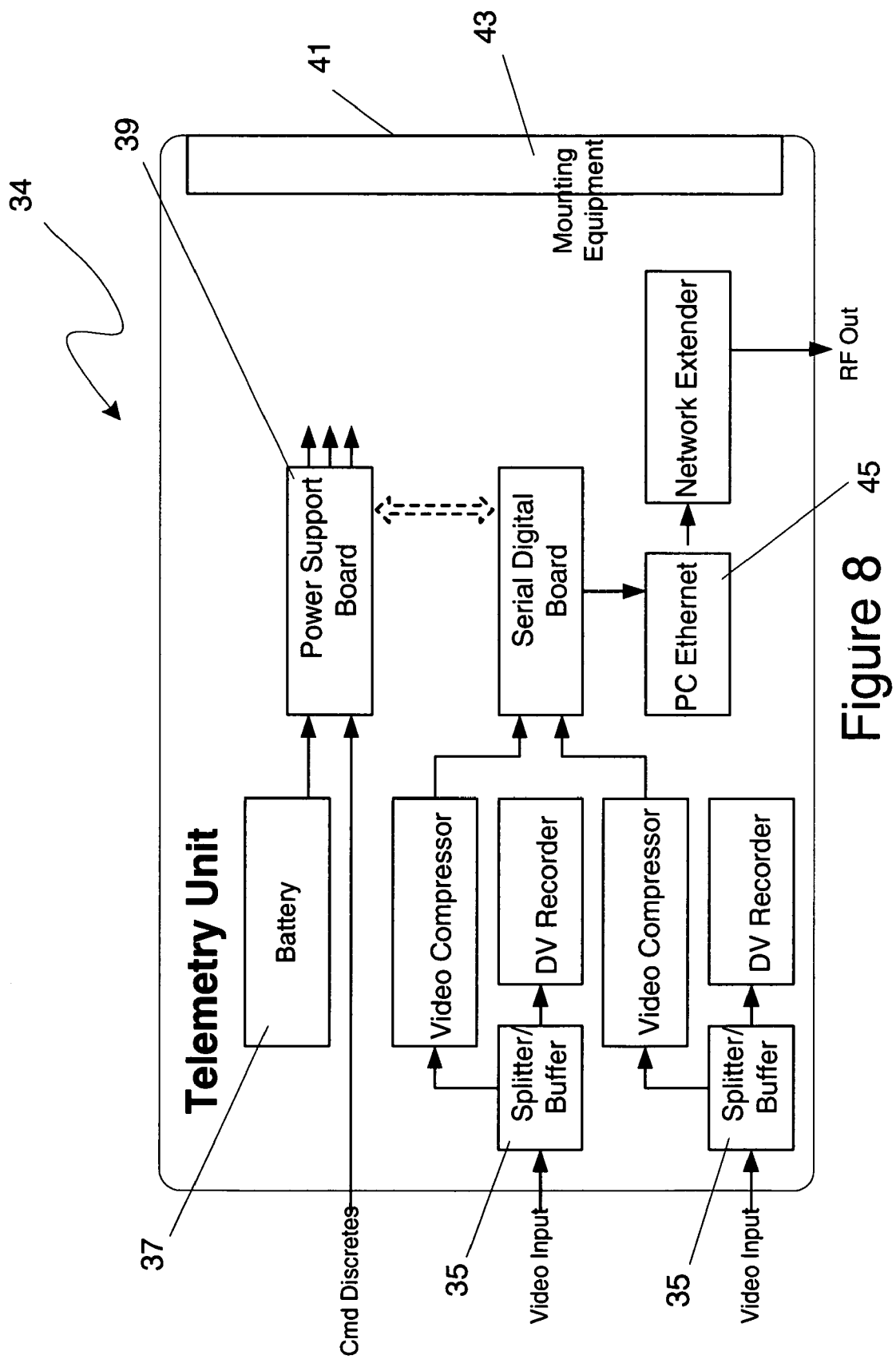
FIG. 8 is a diagram of the telemetry unit assembly of FIG. 7.

Referring now to FIGS. 6 and 8, an example rocket-powered vehicle 12 is shown for use with rocket-powered vehicle competition 10 and method 50. Rocket-powered vehicle 12 is a human-carrying, rocket powered, reusable vehicle, which may include aviation stages (not shown) and is capable of traveling at supersonic speeds. A significant portion of a flight for rocket-powered vehicles 12 should be powered by rocket engines, such as the take-off portion of flight. Each team 24 may provide a document that describes the general nature and configuration of its vehicle, propellants, vehicle non-propellant mass, take-off and landing modes, and its intended flight plans.

Examples of rocket-powered vehicle 12 include rocket-powered vehicles developed for the X PRIZE COMPETITION (discussed in the Background). As shown in FIG. 6, rocket-powered vehicle 12 generally includes a vehicle 26, a propulsion system 28 including a propellant 30, and a flight system 32. Vehicle 26 is capable of carrying one or more human occupants (not shown) during flight. Flight system 32 monitors and/or controls flight conditions. Propulsion system 28 provides rocket-propulsion to vehicle 26 via propellant 30. Propellant 30 may include a variety of rocket fuels, such as an oxidizer (e.g., liquid oxygen, nitrogen tetroxide, nitrous oxide, air, hydrogen peroxide, perchlorate, ammonium perchlorate, etc.) plus a fuel (e.g., light methane, hydrazine-UDMH, kerosene, hydroxy-terminated polybutadiene (HPTB), jet fuel, alcohol, asphalt, special oils, polymer binders, solid rocket fuel, etc.).

An example embodiment of rocket-powered vehicle 12 includes a rocket-powered vehicle named "SPACESHIP ONE" (SS1) (not shown) made by SCALED COMPOSITES, LLC. On Dec. 17, 2003, SCALED COMPOSITES, LLC flew SS1, which is a vehicle developed for the X PRIZE COMPETITION, by launching it from a carrier aircraft and then igniting its rocket engine. The United States Federal Aviation Administration provided a one-year license to SCALED COMPOSITES, LLC on Apr. 7, 2004 for performing additional flights pursuant its entry in the X PRIZE competition.

SS1 is a three-person rocket-powered vehicle that was designed to be attached to a turbojet launch aircraft named "WHITE KNIGHT" (WK) (not shown). WK can launch SS1 by climbing to about 50,000 feet with SS1 attached and then dropping it into gliding flight. SS1 can then use its rocket engine propulsion system 28 to climb steeply at a speed of about 2,500 m.p.h. SS1 may then coast up to an altitude of about 100 km (62 miles) and fall downward. SS1 can convert from a low-drag launch configuration to high-drag configuration, which permits it to perform a safe, atmospheric entry at a slower speed. After it decelerates for atmospheric entry, SS1 converts back to the launch configuration of a conventional glider, which allows it maneuver and glide down to a runway for landing.

Other configurations of rocket-powered vehicles are contemplated for use with the present invention. For instance, at least twelve teams are currently competing in the X PRIZE COMPETITION with rocket-powered vehicles of various configurations and styles, which may be used with competition 10. Rocket-powered vehicles may be multiple stage rockets with reusable vehicles and single stage vehicles. Moreover, the flight system of each rocket-powered vehicle may include a telemetry unit 34, sensors 36 including cameras 38, mode switches 40, and a transmitter 42. As such, flight system 32 is able to record and/or provide accurate measurements of flight conditions to the judges. As discussed later, flight system 32 may also provide real-time information to spectators as they monitor the competition.

Sensors 36 may include a variety of sensing equipment such as accelerometers, altimeters, velocimeters, gimbals, transponders, global positioning systems (GPS) and position sensors, etc., which may include one or more cameras 38, for recording and/or transmitting images during flights. Cameras 38 may be positioned to view both inside and outside vehicle 26. For instance, cameras 38 may be directed toward crewmembers inside vehicle 26 and down toward the earth. Mode switches 40 may be used as necessary to select data feeds received from various sensors and provide it to recording equipment (not shown) or to transmitter 42 for transmission to a ground system 44.

Each team of the competition may carry a telemetry unit 34 on any of their competing rocket-powered vehicles. Telemetry unit 34 provides an integrated device that can be independently calibrated and verified before and after qualifying flights. Each telemetry unit 34 may receive data from at least two externally mounted cameras 38 and two internally mounted cameras 38, and is connected to associated video recording hardware (not shown) and transmitting hardware. The telemetry unit weight and volume may be counted towards the crew requirement mass if desired. On multistage entries, the judges and may have the option to place a telemetry unit on each stage of the rocket-powered vehicle. It is the responsibility of each team to properly install and operate the telemetry unit. Teams may petition to use their own video recording and transmitting hardware so long as the hardware meets the required technical and operational requirements.

Figure 7:
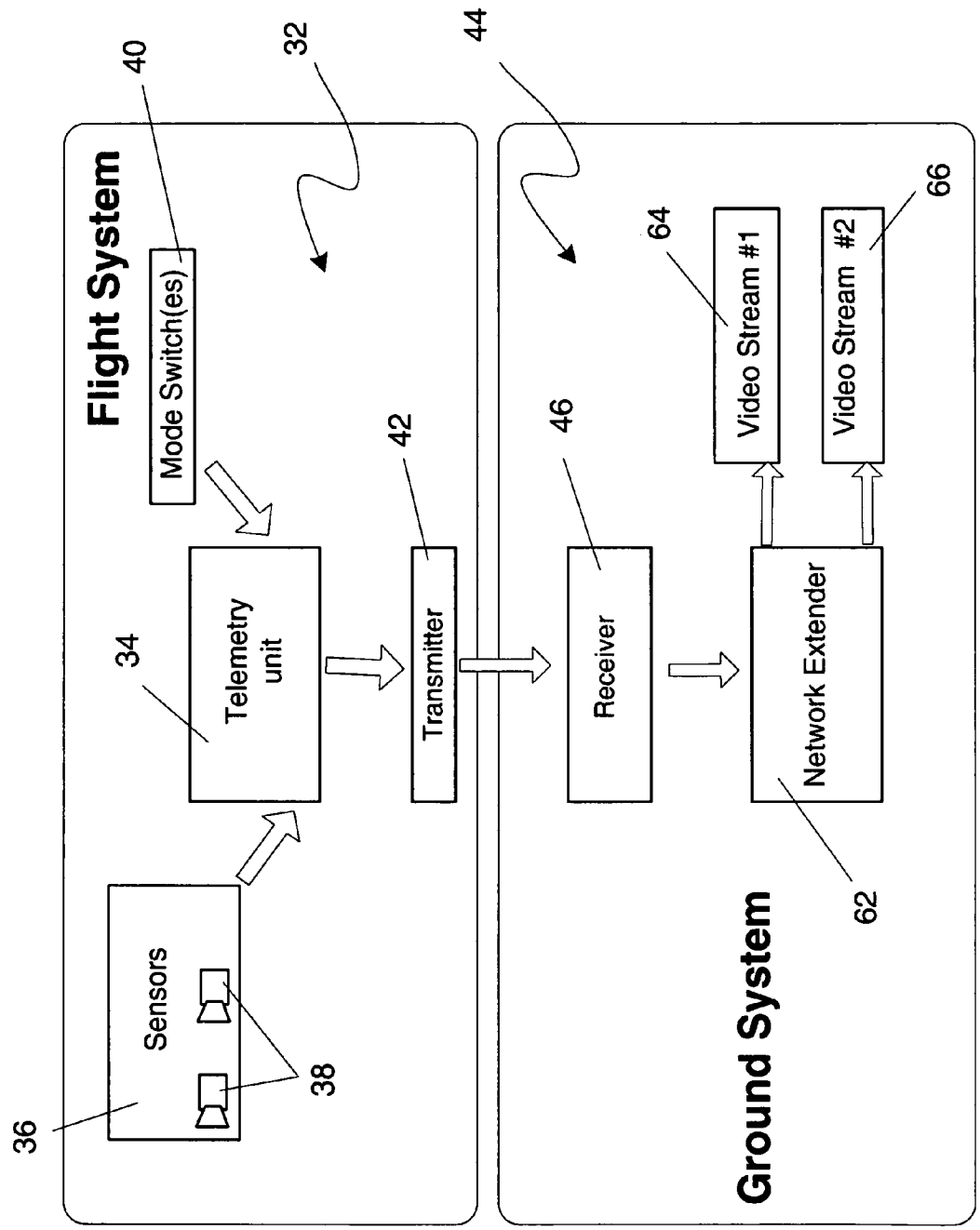
FIG. 7 is a diagram of a flight system and a ground system according to embodiments of the invention for use with the rocket-powered vehicle competition of FIG. 2, the spaceport of FIG. 5 and the rocket-powered vehicle of FIG. 6.

As shown in FIG. 7, data may be sent from rocket-powered vehicle 12 to ground system 44 via transmitter 42, which may be a C-band omni-directional transmitter or other RF transmitter. Transmitter 42 may be directed to a receiver 46 of ground system 44, such as a C-band satellite dish, to provide substantially real-time monitoring of flights. Receiver 46 may be mounted on an antenna gimbal (not shown) to permit it to track a rocket-powered vehicle during flight for strong reception of signals transmitted therefrom. A network extender 62 converts the signals received, which may be two or more video streams 64 and 66. For example, two or more Electrical Ground Support Equipment (EGSE) video streams may be provided during flights of rocket-powered vehicles 12.

FIG. 8 shows an example telemetry unit 34 for use with flight system 32. Telemetry unit 34 is a substantially integrated unit with its own power supply 37 that can receive data from sensing equipment, process the data, store it and provide outputs to external equipment. The power supply may be a 28V battery 37 that powers a power support board 39, which in turn provides power of various voltages to processing equipment (e.g., CPU) (not shown). Telemetry unit 34 may include a chassis 41, such as a U-slot chassis, for containing the components of the telemetry unit, which may be conduction-cooled to reduce power consumption requirements compared with a fan-cooled system. Chassis 41 may be connected to mounting equipment 43 that is standardized for installation in any of rocket-powered vehicles 12, such as 19" rackmount equipment. Telemetry unit 34 receives inputs from sensing equipment, such as video feed from cameras 38 (see FIG. 7), which it processes and/or stores. For instance, it may convert video feed from cameras 38 into a compressible digital format (e.g., MPEG), which can be stored in a digital video recorder and transmitted to ground system 44 (see FIG. 7). Telemetry unit 34 may connect with the flight system 32 of the respective rocket-powered vehicle to receive appropriate command inputs and provide outputs, such as RF video output. Telemetry unit 34 may include a network interface, such as a PC Ethernet card 45, for interfacing with the flight system and/or for providing data to the judges at completion of qualifying flights.

Example Spaceport

Figure 4:
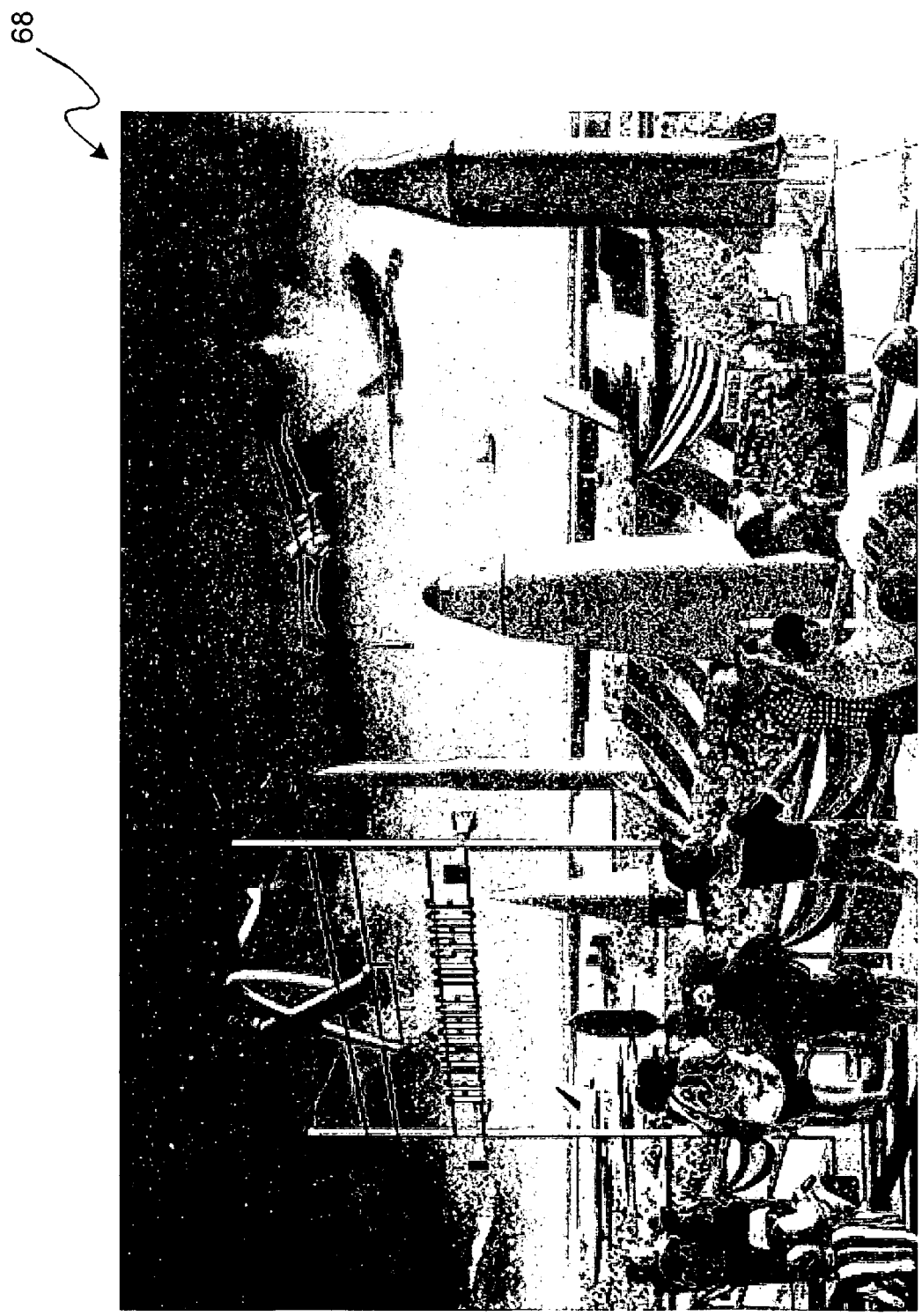
FIG. 4 is a perspective view of a portion of a spaceport according to an embodiment of the invention for use with the rocket-powered vehicle competition of FIG. 2.
Figure 5:
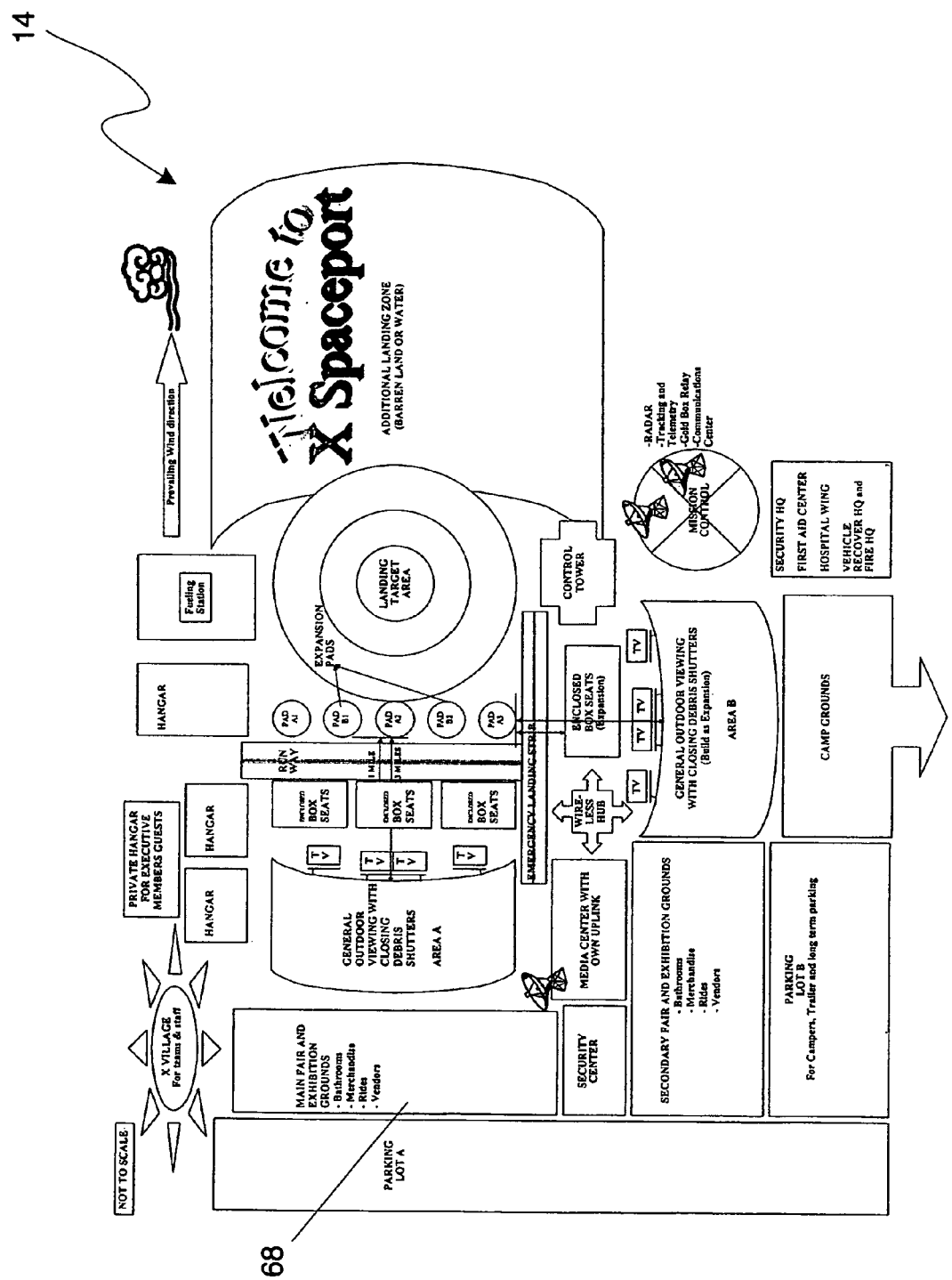
FIG. 5 is a top-view diagram of the spaceport of FIG. 4.
Figure 5A:
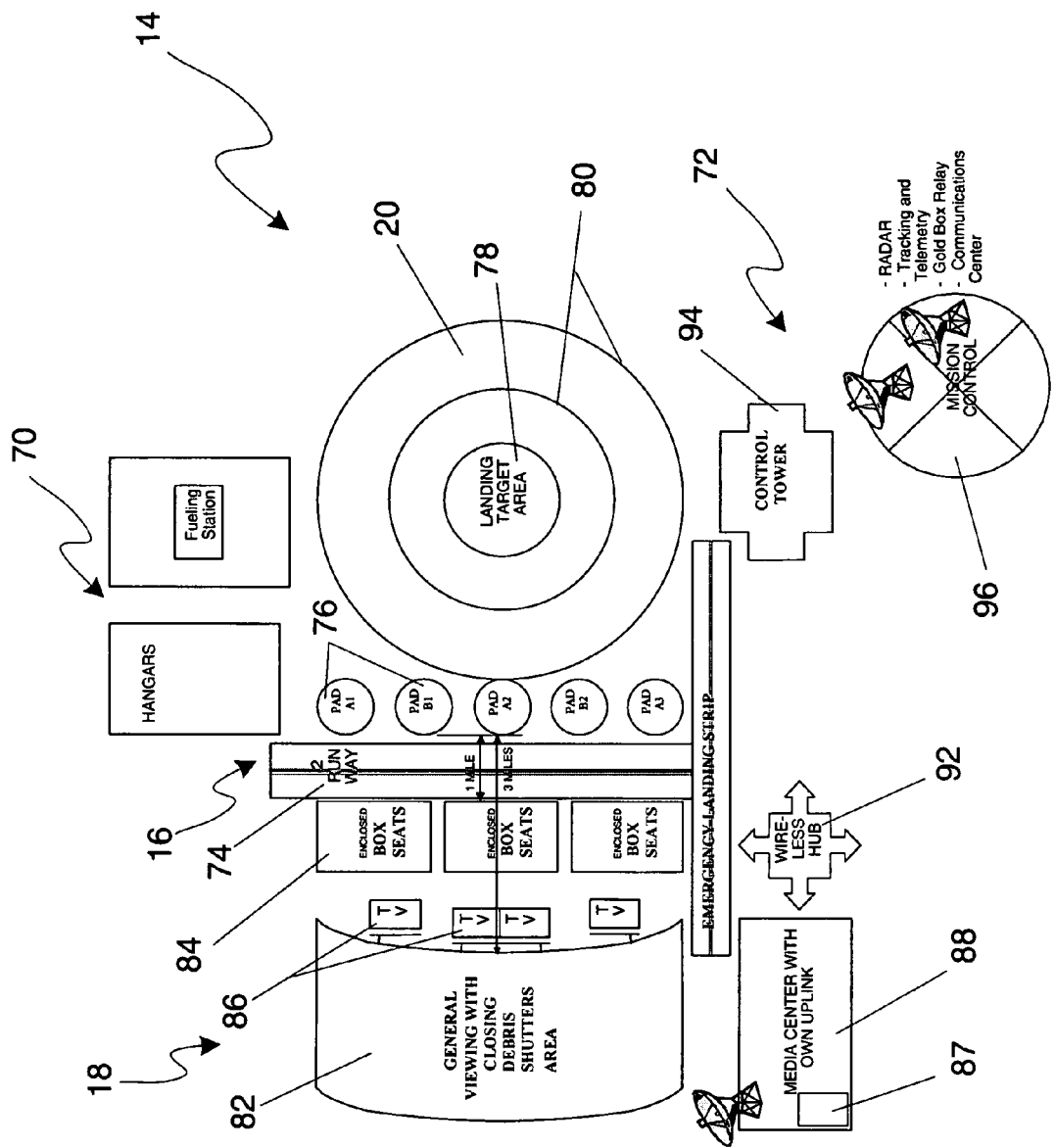
FIG. 5A is a portion of the spaceport diagram of FIG. 5.

Referring now to FIGS. 4, 5 and 5a, spaceport 14 is generally shown. Spaceport 14 provides a pre-determined location from which rocket-powered vehicles 12 can takeoff and land, and from which spectators may view rocket-powered vehicle competition 10. FIG. 4 is a perspective view of a fair and exhibition grounds portion 68 of spaceport 14, which permits spectators to evaluate exhibits and view takeoff and/or landing of rocket-powered vehicles 12 occurring in distant portions of spaceport 14. FIG. 5 is top-view diagram of spaceport 14, and FIG. 5A shows portions of the diagram of FIG. 5. Spaceport 14 may be located in a remote area, such as in the desert of Nevada, in which an exclusive, controlled airspace may be maintained during rocket-powered vehicle competition 10.

As shown in FIG. 5A, spaceport 14 generally includes a launch portion 16, a spectator portion 18, a landing zone 20, maintenance/storage areas 70, and control facilities 72. Launch portion 16 may include a two-way runway 74 to permit rocket-powered vehicles 12 to launch that use winged aircraft (not shown) for takeoff, and for landing winged aircraft (not shown) and/or rocket-powered vehicles 12 as needed. Launch portion 16 also includes pads 76 from which vertical takeoff of rocket-powered vehicles 12 may occur. Landing zone 20 includes a landing target area 78 with target overshoot areas 80. As discussed above, competitors may be evaluated on how close they land their respective rocket-powered vehicle 12 to a target (e.g., bulls eye marker (not shown)) located within landing target area 78.

Spectator portion 18 may include a variety of facilities and areas that are appropriate for the general public, such as fair grounds, exhibition grounds, campgrounds, etc. Further, spectator portion 18 may include viewing facilities located close enough to launch portion 16 and landing zone 20 to permit direct viewing of rocket-powered vehicles 12 as they takeoff and land during competitions. As such, spaceport 18 includes a general viewing area 82 and box seats viewing area 84. General viewing area 80 is located a relatively safe distance from launch pads 76 and landing zone 20. Viewing area 82 may be located about 2 to 5 miles from launch pads 76, and for better viewing, general viewing area 82 may be located about 3 miles from launch pads 76. From these distances, spectators can directly view the launch of rocket-powered vehicles 12 with or without viewing aids (e.g., binoculars) without significant risks from launch failures. Viewing area 80 may be located a greater distance from landing zone 20 than from launch portion 16 due to the generally increased safety risk associated with landing rocket-powered vehicles 12 compared with launching them. To further enhance safety, general viewing area 82 may include debris shutters (not shown), which may be closed quickly in the event of an actual or anticipated unsafe incident (e.g., rocket-powered vehicle crash).

Box seats viewing area 84 is located closer to launch portion 16 and landing zone 20 than general viewing area 80, which increases the risk to the spectators located in this area. As such, box seats viewing area 84 may be enclosed to protect spectators therein, and may provide viewing via view ports made of shatter-resistant transparent materials. To enhance viewing in spectator portion 18, televisions 86 may be provided that show close views of rocket-powered vehicles 12 during launch and landing or at other times, and to show information about competition 10. Televisions 86 may also show substantially real-time status of rocket-powered vehicles 12 during the competitions. For example, televisions 86 may show a graphical representation of a competing rocket-powered vehicle 12 at its present location as it advances along its flight path 22 so that spectators may monitor its progress as it occurs. This information may be obtained via information acquired by the rocket-powered vehicle's telemetry unit 34. Televisions may also shows views from cameras 38 on the respective rocket-powered vehicle.

Information shown on televisions 86 may be provided from a media center 88 and/or from mission control 90 (discussed later). Media center 88 processes and collates information for display on television 86 and for providing it to spectators at other locations, media outlets, etc. As such, media center 88 may have its own satellite uplink (not shown) for sharing information related to rocket-powered vehicle competition 10. Media center 88 may include a server or other computer 87, which creates graphical representations of the status of rocket-powered vehicles 12 in relation to their flight paths 22, other rocket-powered vehicles, and/or virtual pylons. The term virtual pylon as used herein means a three-dimensional location above the earth's surface. For example, a three-dimensional location may be identified by the judges (e.g., 3-dimensional geographical coordinates for a point in space) as a virtual pylon that a rocket-powered vehicle should encounter within a given distance in order to meet a criterion of passing through the virtual pylon. Computer 87 may use location information provided by the telemetry units 34 of each rocket-powered vehicle 22 via ground system 44 to provide substantially real-time status and location information to the spectators. Media center 88 may also provide information to a wireless hub 92 for dissemination to spectators located at spaceport 14 and/or for transmission to others via the Internet. For example, spectators may be able to access information personally that is provided on televisions 86 and/or other information via wireless hub 92. For instance, a first spectator may be able to monitor progress of a first team 24 via wireless hub 92 while a second spectator monitors progress of a second team 24 via wireless hub 92. In one configuration, televisions 86 display a virtual crash when a team fails to maneuver around a required virtual pylon.

Much of the information provided to spectators is provided via control facilities 72. Control facilities 72 include a control tower 94 and mission control 96. Control tower 94 provides a birds-eye view of spaceport 12 to operational control personnel, such as aircraft controllers, to assist command and control of competition 10. Mission control 96 includes equipment such as RADAR, tracking and telemetry equipment, ground system 44 (shown in FIG. 7), and communications equipment. Mission control shown in FIGS. 5 and 5A may include ground system 44. Information transmitted from rocket-powered vehicles 12 to ground system 44 enables command and control to monitor and verify the flight path 22 of respective rocket-powered vehicles 12. The information may also be communicated to spectators via televisions 86 and/or wireless hub 92, such as rocket-powered vehicle location and video feeds.

Spaceport 14 provides a controlled venue, which combined with rocket-powered vehicle competition 10 occurring over a defined time period, creates an exciting atmosphere that may appeal to a broad cross-section of the public and to corporate sponsors, and which can increase interest in the development of public space travel. To promote a festive atmosphere further at rocket-powered vehicle competitions 10, spaceport 14 may support spaceflight-related activities that keep spectators engaged and provide hands-on experiences to involve them personally in the public spaceflight industry.

For example, spaceport 14 participating in a rocket-powered vehicle competition may support an overall mix of events and activities focused on those areas that directly compliment the public spaceflight industry. As such, a Public Spaceflight Exhibition (not shown) may be included in rocket-powered vehicle competition 10 to provide spectators the opportunity to participate in sub-orbital flights, parabolic (zero gravity) flights, and high-fidelity simulations can build public excitement and ultimately the public acceptance of this market arena. As another example, integrating public spaceflight related rides and unique astronaut training opportunities can greatly enhance the competition. For a fee, spectators may be able to experience the sensations of space flight in rides and simulators. For instance, the Zero Gravity Corporation (ZERO-G) may provide parabolic flights in its Boeing 727 airplane to offer customers up to 20 parabolas, each with 30 seconds of zero-g time. ZERO-G has the capacity to carry more than 100 paying passengers per day. Additional weightlessness experiences may include neutral buoyancy simulations, which are essentially large water tanks that re-create a spacewalk in a spacesuit. Simulations of the launch and re-entry of the rocket-powered vehicles may be provided by a centrifuge to recreate the gravitational forces that the rocket-powered vehicles experience. Additionally, a full-motion interactive flight simulator, similar to the ones used for airline and military flight training, may provide additional spaceflight experiences.

Further, rocket-powered vehicle competition 10 may incorporate an astronaut training facility akin to SPACE CAMP that simulates the full astronaut training experience. The direct effect and goal of these activities is a change in perception by the public from the impossibility to the possibility of public spaceflight. In addition, an Air and Rocket Show segment of the rocket-powered vehicle competition may be provided to provide further entertainment and draw large numbers of spectators. Lending a unique flavor to the Exhibition may be a demonstration of Unlimited Class Vehicles, which are piloted non-X PRIZE class rockets and rocket-powered vehicles. A thrilling exhibition of rocket vehicles also may be featured during the air show. For example, XCOR Aerospace's rocket powered Long EZ airplane could be a featured attraction. These exciting ships, although not directly eligible for the rocket-powered vehicle competition, may nonetheless provide an exciting and memorable demonstration of the endless possibilities and unique applications of rocket propulsion. Additionally, the teams may have the opportunity to display mock-up or partially constructed vehicles.

Example Rocket-Powered Vehicle Competition with Virtual Pylons

Figure 9:
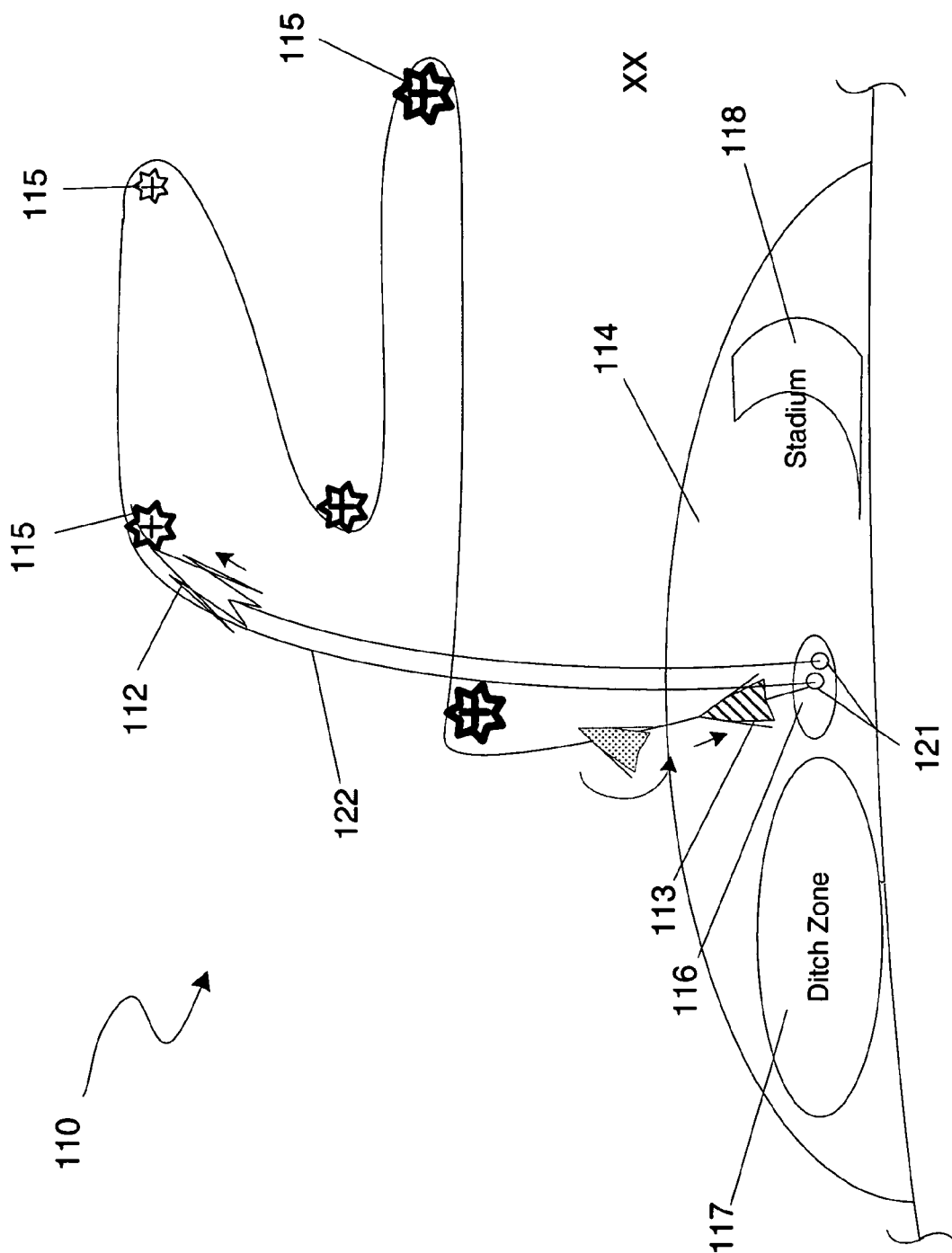
FIG. 9 illustrates a rocket-powered vehicle competition according to another embodiment of the invention.
Figure 10:
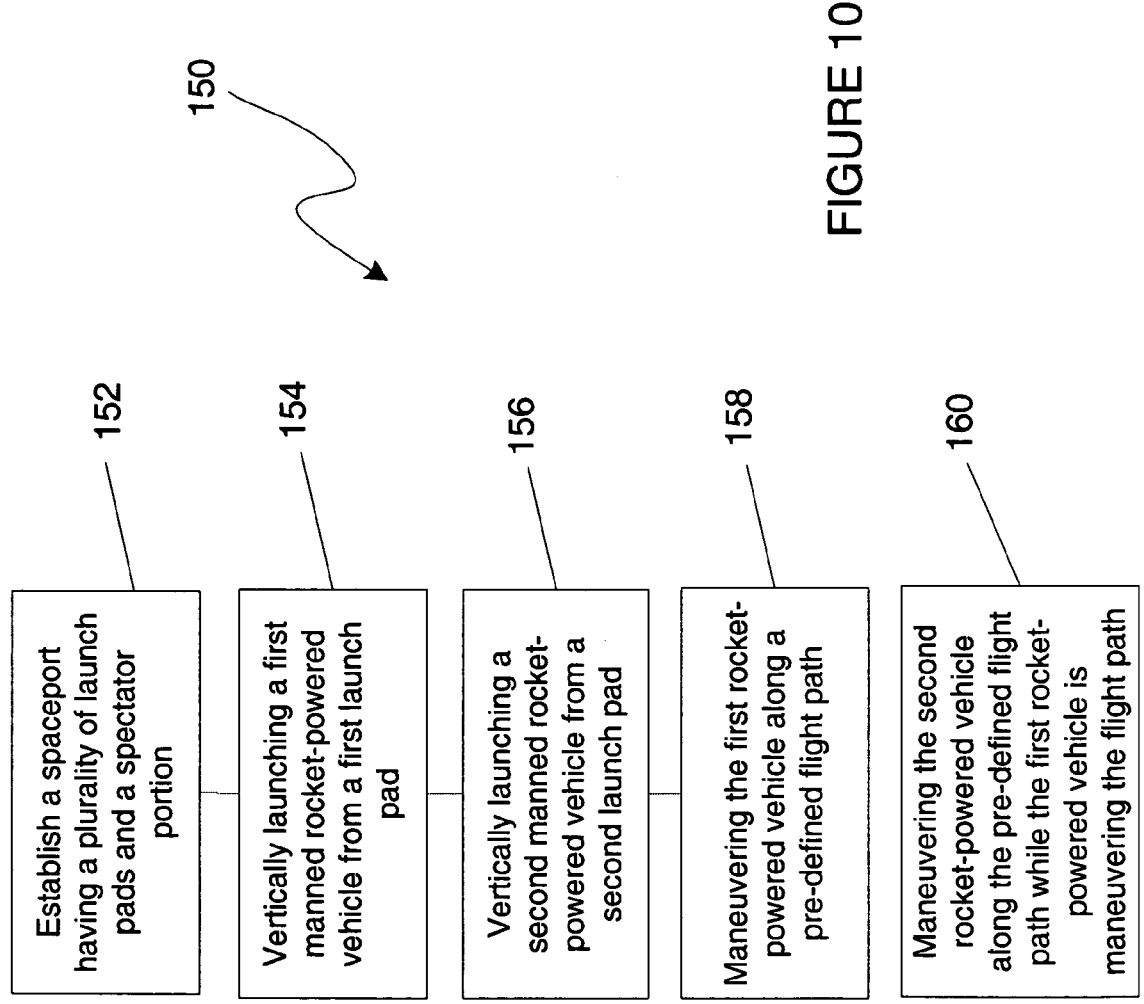
FIG. 10 shows a method for racing rocket-powered vehicles in the rocket-powered vehicle competition of FIG. 9.

Referring now to FIGS. 9-12, a rocket-powered vehicle competition 110 (FIG. 9), a rocket-powered vehicle racing method 150 (FIG. 10), a spaceport 114 (FIG. 11), a display 200 (FIG. 12) and a telemetry computer 87 according to further embodiments of the invention are generally shown. Aspects of these further embodiments are generally the same as previously discussed embodiments, except as discussed hereafter. Referring now to FIGS. 9 and 10, a rocket-powered vehicle competition 110 and a method 150 for racing rocket-powered vehicles is generally shown according to an embodiment of the invention. As shown in FIG. 9, rocket-powered vehicle competition 110 generally includes rocket-powered vehicles 112, 113 and a spaceport 114 having a launch portion 116, a spectator portion 118 and a ditch zone 117. Launch portion 116 provides an area for substantially vertical takeoff and landing of rocket-powered vehicles 112 and 113. During competition with each other, rocket-powered vehicles 112, 113 follow a pre-determined flight path 122, which is established according to virtual pylons 115. Pre-determined flight path 122 may include a wide variety of flight paths such as substantially vertical flight paths, parabolic flight paths, etc. Further, pre-determined flight path 122 may include several turns that require rocket-powered vehicles 112 and 113 to perform several maneuvers. Further, a significant portion of pre-determined flight path 122 may be within direct viewing of spectators located at a stadium 118 in the spectator portion. For example, flight path 122 may include virtual pylons 115 located between about 5,300 feet (one mile) and 53,000 feet (10 miles). Rocket-powered vehicles 112 and 113 maneuvering at these altitudes may be directly viewed by spectators at stadium 118 using binoculars and telescopes. Further, flight path 122 may include virtual pylons 115 located between about 10,000 feet and 33,000 feet, which provides a range of altitudes that are located a relatively safe distance from stadium 118 without being too far away for viewing.

Rocket-powered vehicle competition 110 may involve racing of two or more rocket-powered vehicles 112 and 113 substantially simultaneously on the same flight path 122 (i.e., racecourse). The racecourse may be formed and navigated using virtual pylons 115. For example, each rocket-powered vehicle 112 and 113 may be provided the three-dimensional locations of virtual pylons 115 prior to and/or during rocket-powered vehicle competition 110. The racecourse may also include virtual tunnels described by three-dimensional locations, within which the rocket-powered vehicles should remain during the race. Optionally, each rocket-powered vehicle and/or team may be provided with their own virtual tunnel within which they should remain during the race. Thus, in various combinations, the racecourse may include virtual pylons, racecourse virtual tunnels, and individual team/vehicle virtual tunnels located within a racecourse virtual tunnel. The pilots of the rocket-powered vehicles may then navigate their respective rocket-powered vehicles around, through and/or proximate to the pylons according to the race criteria and the racecourse data. The pilots may use global positioning technology to determine their precise three-dimensional location with respect to the pylons and the racecourse. Each rocket-powered vehicle's three-dimensional position during the race may be provided to telemetry unit 34 during competition and may be transmitted to ground system 44 for monitoring by the judges and spectators. FIG. 9 shows an example in which rocket-powered vehicles 112 and 113 are required to maneuver around virtual pylons 115 within a pre-determined distance based on racecourse data. It is contemplated that RADAR or other location tracking systems may be used in addition to global positioning systems in order to track and maneuver the rocket-powered vehicles in relation to the virtual pylons and the racecourse data.

FIG. 10 shows a method 150 for racing rocket-powered vehicles that may occur as part of rocket-powered vehicle competition 110. Method 150 generally includes establishing 152 spaceport, which includes vertical launch pads and a spectator portion, and landing and launching rocket-powered vehicles for substantially simultaneous competition along a flight path. Rocket-powered vehicles 112 and 113 race by competing with one another according to the pre-determined criteria and along the same three-dimensional flight path 122. The rocket-powered vehicle competition of method 150 includes at least two rocket-powered vehicles launching and landing from spaceport 114 within view of stadium 118 and competing along flight path 122 at substantially the same time. As such, a first rocket-powered vehicle 112 vertically launches 154 from launch portion 116 and a second rocket-powered vehicle 113 also launches from launch portion 116 at substantially the same time or within a short time period after the launch of rocket-powered vehicle 112 on the same day. Both rocket-powered vehicles 112 and 113 maneuver along flight path 122 and vertically land at launch portion 116. Depending on the pre-determined criteria for the competition, rocket-powered vehicles 112 and 113 may repeat flight path 122 several times via several launches and landings.

Figure 11:
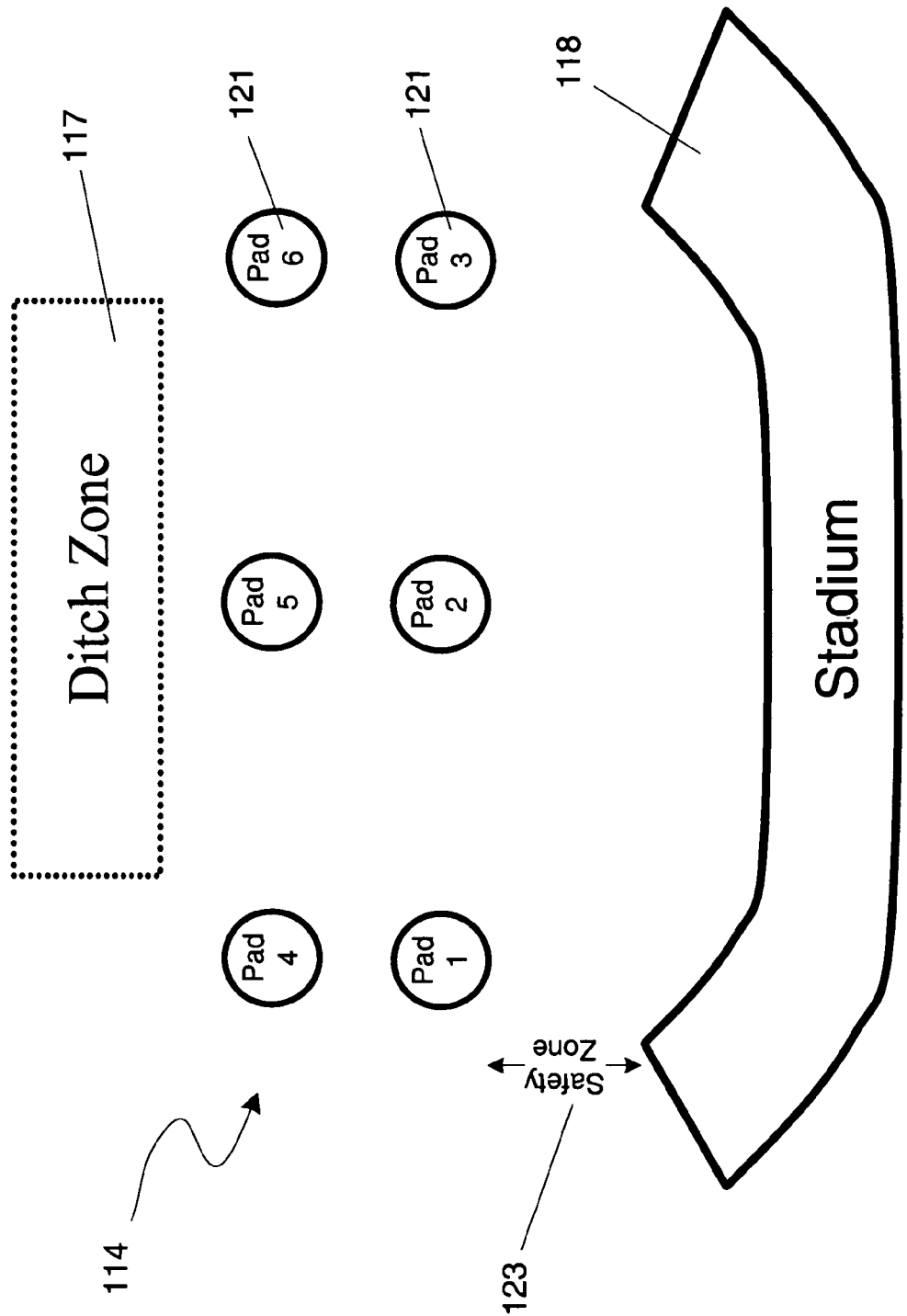
FIG. 11 is a top-view diagram of a portion of a spaceport according to an embodiment of the invention for use with the rocket-powered vehicle competition of FIG. 9.

FIG. 11 shows a top view of a spaceport 114 for use with rocket-powered vehicle competition 110. As shown, a plurality of launch pads 121 are provided a safe distance 123 from stadium 118. Although any number of launch pads may exist as desired, there may be at least six launch pads to support at least six rocket-powered vehicles in a single competition. A ditch zone 117 is provided a greater distance from stadium 118 than launch pads 121. Ditch zone 117 is a relatively large area located away from personnel and structures where rocket-powered vehicles 112 and 113 may be directed in the event of an emergency. Stadium 118 may be located about 3-5 miles from launch pads 121, and is preferably located about 1-2 miles from launch pads 121.

Stadium 118 is a large arena designed to hold a large number of spectators. For instance, stadium 118 may be able to hold about 1 million spectators. Stadium 118 may be a semicircle design that provides good viewability of launch pads 121 to most spectators located therein. To provide safe premises in the event of an emergency, a bunker (not shown) may be provided or stadium 118 may be substantially built within a bunker. Other safety mechanisms may exist, such as protective louvers that may be rapidly closed to provide protection, or protective transparent materials that shield spectators from debris in the event of a rocket-powered vehicle crash or collision. To improve viewability of the rocket-powered vehicle competition 110, stadium 118 may include multiple high-definition displays that show various views of the rocket-powered vehicles. Further, seats within stadium 118 may include personal displays, which individual spectators may control to view status of the competition, information about various rocket-powered vehicles, etc. As described above with spaceport 14 in FIGS. 5 and 5A, rocket-powered vehicle information, video feeds, graphical representations of flight status, etc. may be provided to displays via telemetry unit 34, ground system 44, mission control 96, media center 88, wireless hub 92, etc.

Figure 12:
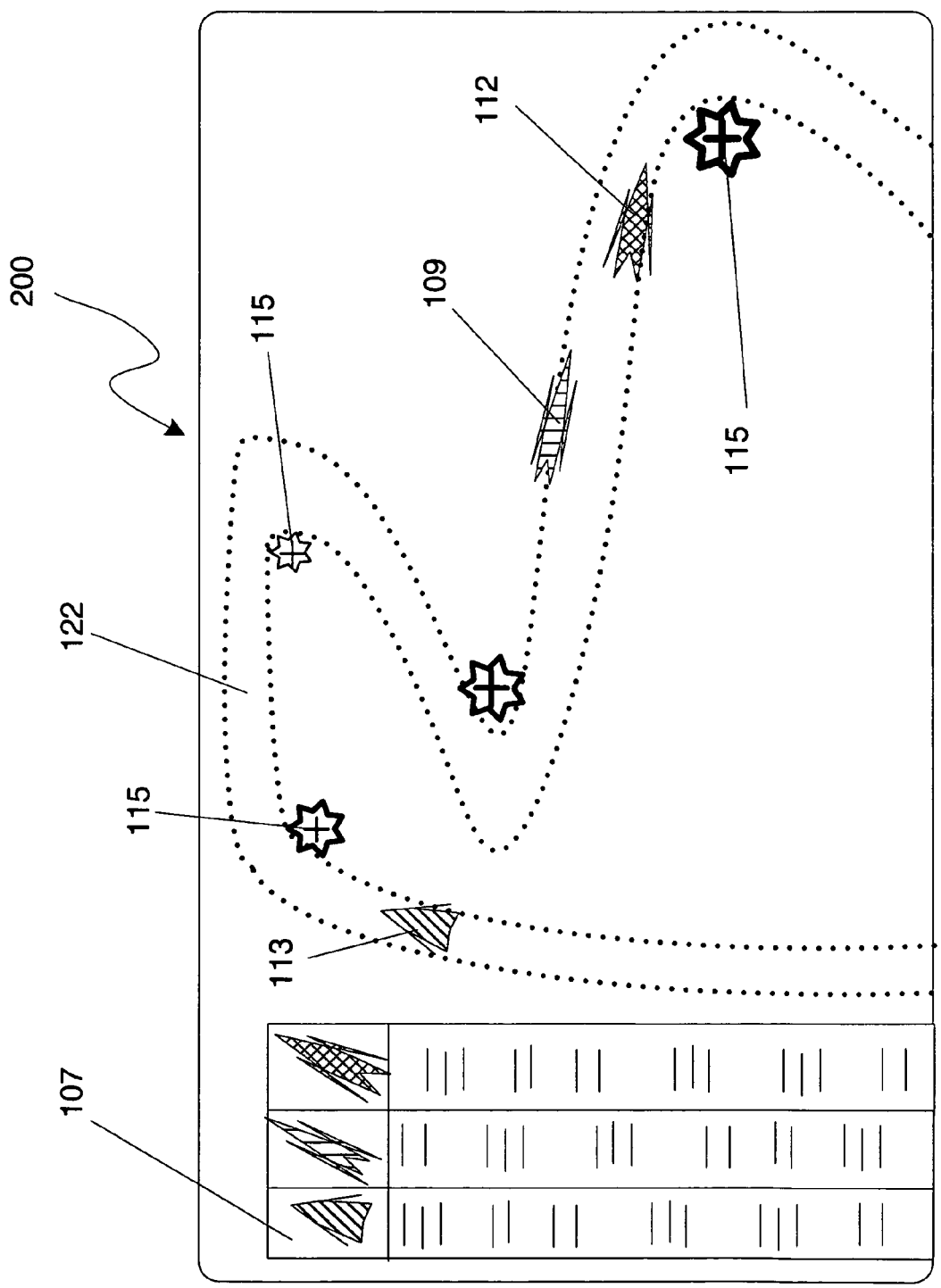
FIG. 12 shows a display for use with the spaceport of FIG. 11.

FIG. 12 shows a sample display 200 that may used with spaceports 14 and 114. Display 200 may be shown on personal displays installed in stadium 118, televisions within the spaceports, personal display devices (e.g., PDAs) in communication with wireless hub 92 (see FIG. 5A), etc. The example shown on display 200 is a graphical representation corresponding with rocket-powered vehicle competition 110. As shown, representations of rocket-powered vehicles 109, 112 and 113 competing in rocket-powered vehicle competition 110 are shown. Their locations in display 200 substantially represent their real-time location based on information from their respective telemetry units 34 and/or mission control 96. Their locations show their progress along racecourse virtual tunnel 122 in relation to pylons 115 and in relation with each other. Pylons 115 may change color or otherwise indicate when a respective rocket-powered vehicle passes the pylon. For instance, a pylon 115 may blink red when a rocket-powered vehicle is close to the three-dimensional location in space represented by the pylon. When the rocket-powered vehicle passes the three-dimensional location based on radar tracking, GPS coordinates, etc., the pylon may turn to a solid green color and remain that way until another rocket-powered vehicle approaches.

Figure 13:
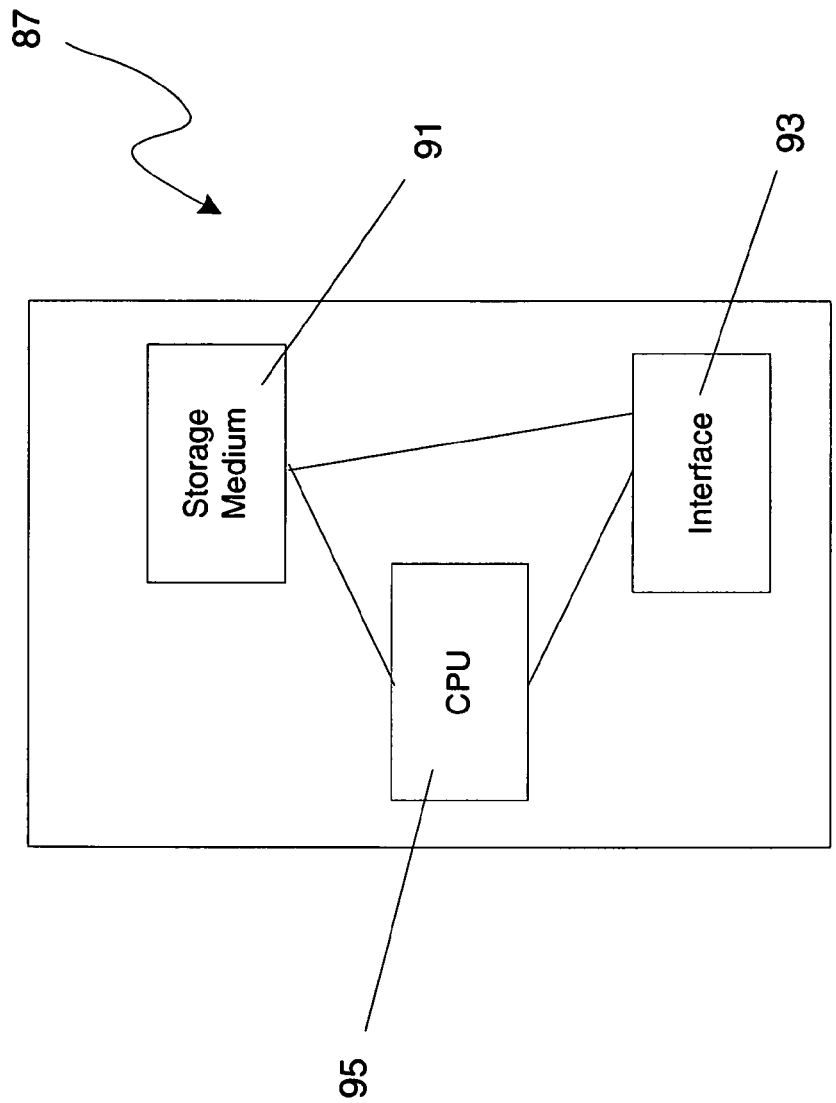
FIG. 13 shows a telemetry computer according to an embodiment of the invention for use with the rocket-powered vehicle competitions of FIGS. 2 and 9.

FIG. 13 shows a telemetry computer 87 that generates graphical displays showing status of the rocket-powered vehicle competition, information about rocket-powered vehicles, video feeds, etc. For instance, telemetry computer 87 may generate display 200 shown in FIG. 12. Telemetry computer 87 may be a server or other computing device. In general, computer 87 includes an interface 93, a CPU 95 and a storage medium 91, such as a hard drive, a network accessible storage location, local memory, etc. Interface 93 may include one or more interfaces, such as a wired network interface, a wireless network interface, etc. Storage medium 91 stores software for instructing the CPU to generate displays, such as display 200, based on information received via interface 93. For example, computer 87 may receive location information for each rocket-powered vehicle from ground system 44 (see FIG. 7) via telemetry unit 34. The location information may be based on sensors within the respective rocket-powered vehicle, such as global positioning sensors. Computer 87 may also receive location information for the rocket-powered vehicles from mission control 96 (see FIG. 5A) determined via RADAR or other tracking and telemetry systems.

Based on the location information received for the rocket-powered vehicles, which may be received on a substantially constant, real-time basis from each competing rocket-powered vehicle, CPU 95 generates a graphical display such as display 200 showing the location of each competitor rocket-powered vehicle. The graphical display may be a three-dimensional display. As shown in FIG. 12, the display generated by computer 87 may include virtual pylons 115 and racecourse tunnel 122, and show the rocket-powered vehicles in relation to them. The virtual pylons 115 and racecourse information may be stored in storage medium 91 or provided via interface 93. As also shown in FIG. 12, computer 87 may display supplemental information 107 about each rocket-powered vehicle, such as specifications, payload, team information, etc.

In addition to being shown on displays within spaceports 14 and 114, displays generated by telemetry computer 87 may be provided to spectators via the Internet or wireless hub 92 (see FIG. 5A). Further, computer 87 may act as a central repository to store and collate information about competitions 10 and 110 prior to, during and/or after they occur, and to provide that information to spectators, judges and/or the public. For instance, using a computing device (not shown) in communication with wireless hub 92, a spectator may be able to navigate a three-dimensional graphical display of the race as it is occurring using data from telemetry computer 87. As such, the spectator may be able to zoom in and out of portions of a graphical representation of the racecourse shown on their computer to view progress of specific rocket-powered vehicles. They may also be able to switch between video feeds from one or more rocket-powered vehicles provided to computer 87 via telemetry units 34 for the rocket-powered vehicles. Thus, telemetry computer 87 may permit spectators to actively monitor the competition and the progress of all participants on a substantially real-time basis.

Rocket-powered vehicle competition 110, method 150 and spaceport 114 provide an exciting event with which spectators may feel a sense of participation. This is partially because racecourse tunnel 122 is a closed flight path within direct viewing by spectators (e.g., via eyesight, binoculars and telescopes) and via equipment (e.g., graphical representations of race status). To enhance the level of excitement further, rocket-powered vehicle competition may require rocket-powered vehicles 112 and 113 to complete multiple laps on the racecourse 122. This may include staying on the ground for periods of time to re-fuel and prepare the rocket-powered vehicles for further flight and multiple take-offs and landings, which provide many opportunities for spectators to view varied aspects of the competition. Spectators may also be able to view the rocket-powered vehicles on their respective launch pads prior to the beginning of the competition.

Rocket-powered vehicles 112 and 113 (as well as rocket-powered vehicles 12 in competition 10) may be controlled by the human occupants; although, certain aspects may be computer controlled as determined by race criteria (e.g., blast off may be largely computer controlled). This makes the competition very exciting to spectators and provides "heroes" that may be created of exceptional pilots. Add to that the excitement of supersonic, rocket-propelled rocket-powered vehicles competing with one another substantially simultaneously, and a thrilling competition is created that should appeal to a large segment of society and attract corporate sponsors.

Figure 14A:
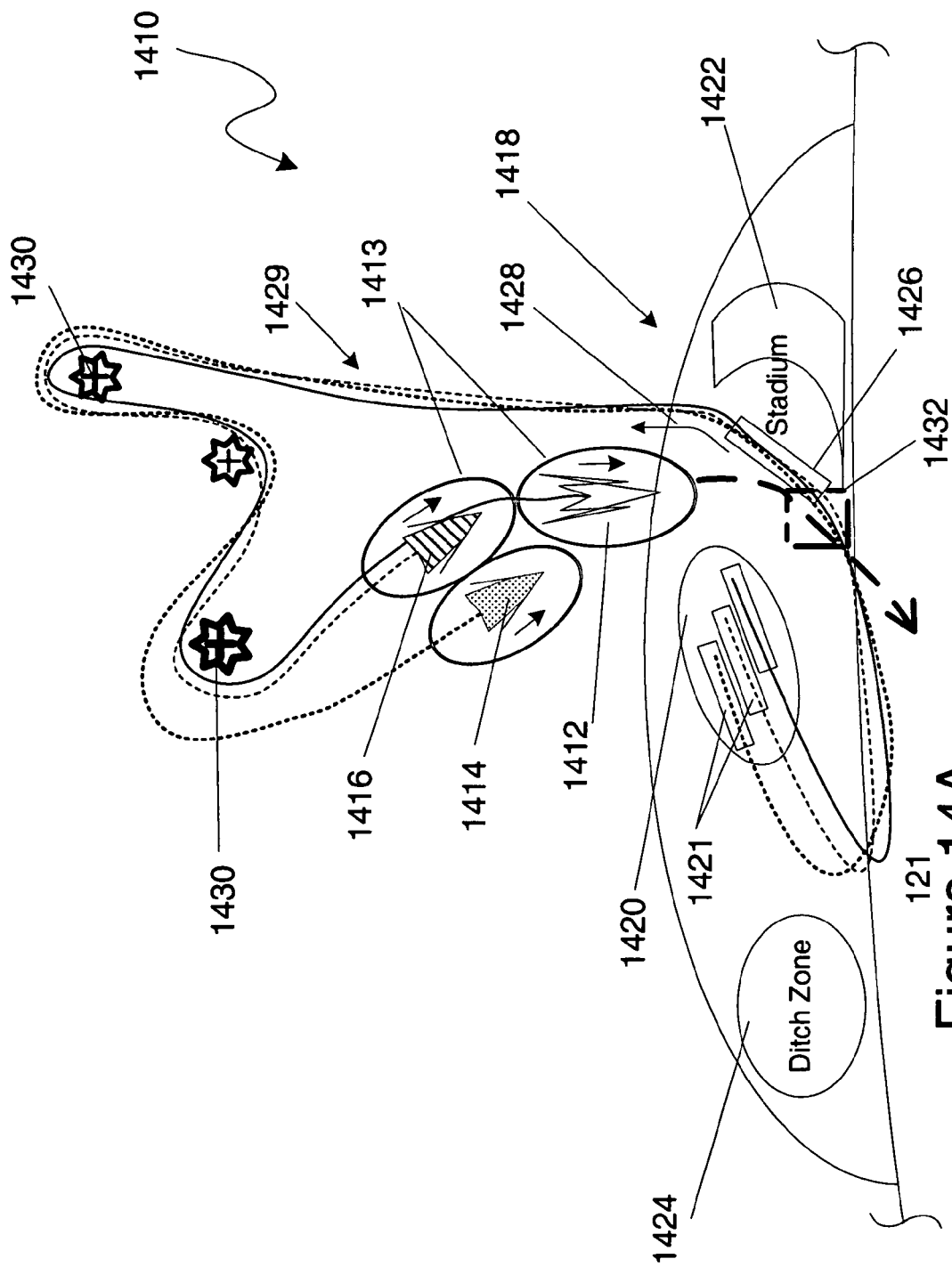
FIGS. 14A and 14B illustrate rocket-powered vehicle competitions according to embodiments of the invention.

Example Rocket-Powered Vehicle Competition with Direct Racing Between Participants Referring now to FIGS. 14A-C, 15 and 16, a rocket-powered vehicle competition 1410 (FIGS. 14A and 14B), a rocket-powered vehicle racing method 1510 (FIG. 15), a rocket-powered vehicle (FIG. 16) 1610 and a spaceport 1418 (FIGS. 14A-C) according to further embodiments of the invention are generally shown. Aspects of these further embodiments are generally the same as previously discussed embodiments, except as discussed hereafter. As shown in FIG. 14A, rocket-powered vehicle competition 1410 generally includes rocket-powered vehicles 1412, 1414 and 1416, and a spaceport 1418 having a launch and/or landing portion 1420, a spectator portion 1422, a ditch zone 1424 and a touch strip 1426.

Rocket-powered vehicle competition 1410 provides a high level of excitement for spectators and participants alike via direct, head-to-head racing between the race participants to be the first to complete a race course. The exciting atmosphere can be further enhanced for the spectators through various aspects of the racing method that may be practiced alone or in a variety of combinations including: vertical take-offs near the spectator portion 1422; visual and audible mechanisms for clearly identifying participant rocket-powered vehicles; pre-determined racing parameters including rapid refueling and limited fuel quantity, engine burn time and/or thrust options; rocket-powered vehicle configurations based on the parameters and strategic options for the participants in response to the parameters (e.g., choices involving fuel quantity and thrust management); spectator interactivity with the race participants; and user participation in real-time races via virtual rocket-powered vehicles.

Figure 14B:
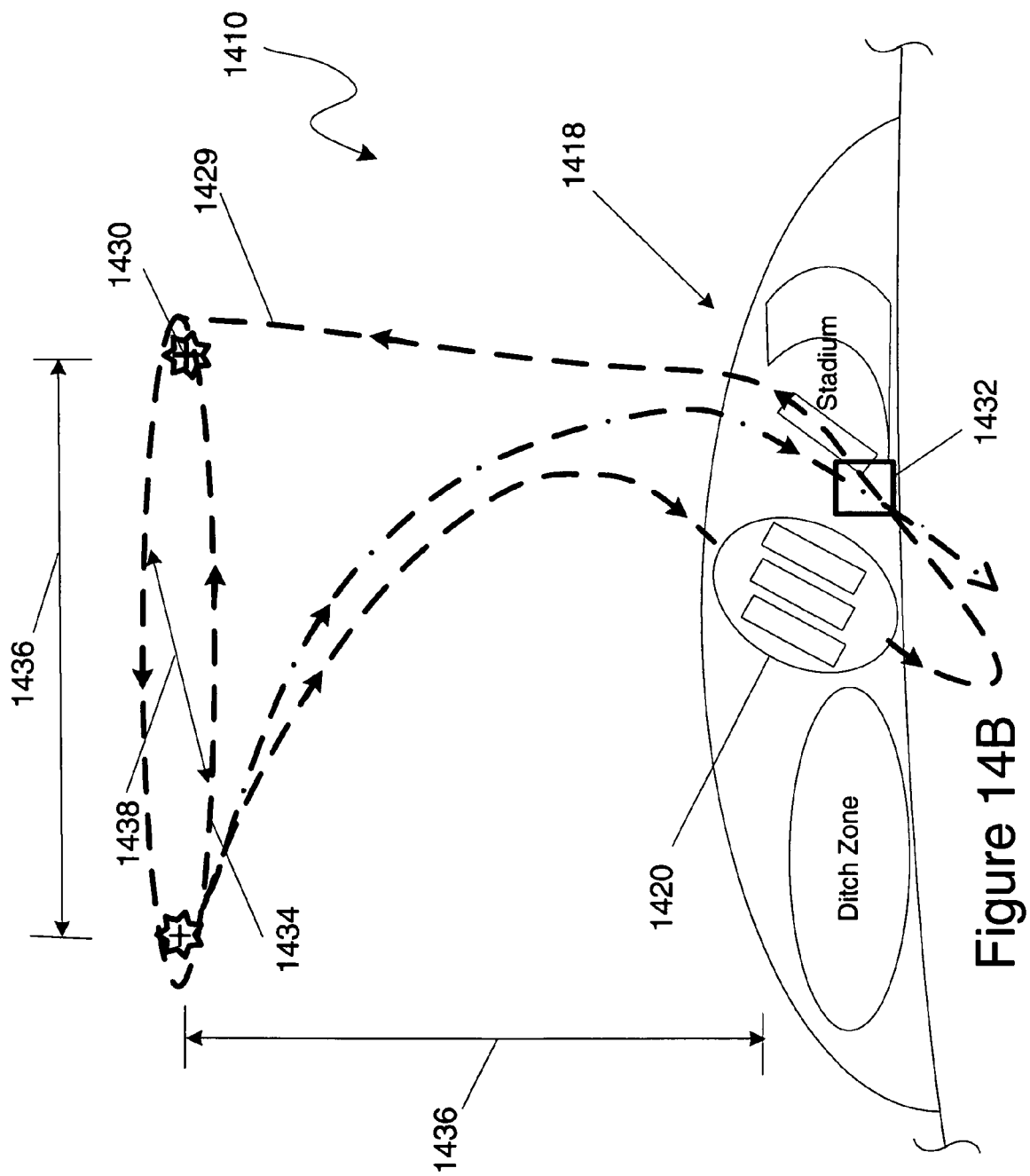
Figure 15:
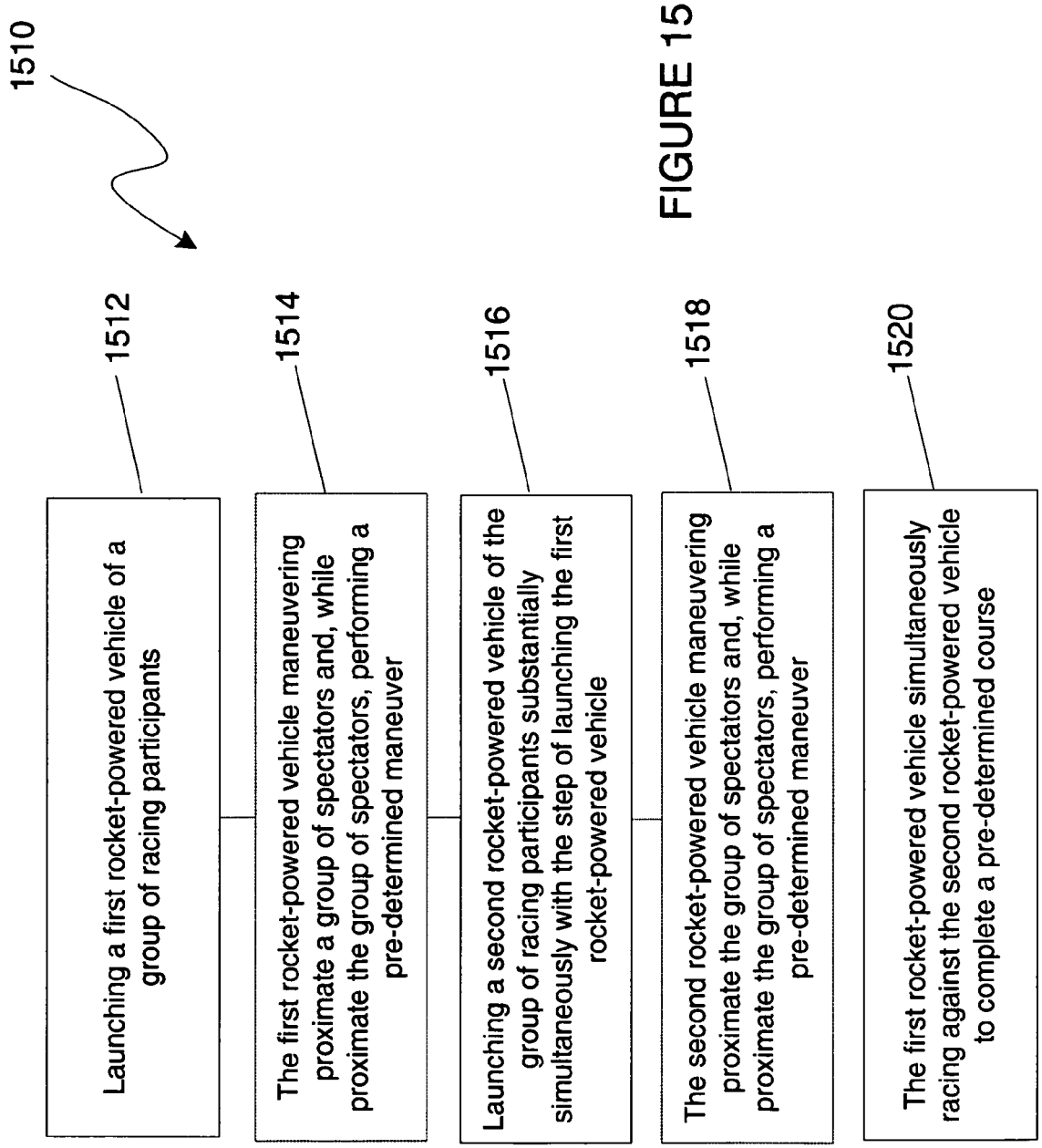
FIG. 15 shows a method for racing rocket-powered vehicles in the rocket-powered vehicle competitions of FIGS. 14A and 14B.

As shown in FIG. 15 and as generally depicted in FIGS. 14A and 14B, the rocket-powered vehicles of rocket-powered vehicle competition 1410 will race in groups of two or more along the same course. The racing may be performed in "heats" where small groups of participants race to qualify, the winners of which progress to the next level. The racing may also be performed as comprehensive racing between all participants. Accordingly, rocket-powered vehicle method 1510 includes the step 1512 of launching a first rocket-powered vehicle of a group of racing participants and the step 1516 of launching a second rocket-powered vehicle of the group of racing participants substantially simultaneously with the step of launching the first rocket-powered vehicle. The rocket-powered vehicles may be launched abreast or in a staggered fashion, which may be advantageous for logistical and safety reasons. As illustrated in FIG. 14A, the rocket-powered vehicles may launch and land in a horizontal manner similar to conventional fixed wing aircraft along an airstrip 1421 of launch portion 1420, which may be a single airstrip, a plurality of shared airstrips, or a plurality of participant-specific airstrips. After launch, each rocket-powered vehicle can turn 1428 its flight path 1429 to a substantially vertical flight path and fire its rockets for vertical take-off. The rocket-powered vehicles can land on a landing strip by gliding in a manner similar to conventional fixed wing aircraft. Rocket-powered vehicles that can fly in both horizontal and vertical configurations may be advantageous for racecourses requiring repeated take off and landing. Example rocket-powered vehicles that can fly in both configurations are described hereafter along with FIG. 16.

According to an optional aspect of method 1510, each participant rocket-powered vehicle may be required to perform the step 1514, 1518 of maneuvering proximate a group of spectators and, while proximate the group of spectators, performing a pre-determined maneuver. The maneuver location may be closer to the spectators than the respective launch location of each rocket-powered vehicle. This can permit the spectators to have a relatively close view of an exciting maneuver, such as vertical take-off, which they may not be able to view as closely as they could otherwise view due to safety or logistical considerations. Such a maneuver location can also permit the spectators to directly view significant portions of the race that they may otherwise not be able to view or that they may be required to view remotely (e.g., via a display). For instance, the maneuver may include the participants proceeding past a finish line or through a finish gate 1432 to complete the race. Direct spectator observation of the race completion can heighten the excitement of the event. In another example, each rocket-powered vehicle may be required to perform a vertical take-off maneuver close to the spectators at spectator portion 1422, which is an exciting maneuver to observe due to the firing of the rockets and the rapid ascent of the rocket-powered vehicle. In addition, each rocket-powered vehicle may be required to perform a touch-and-go maneuver at touch strip 1426 proximate the spectators while flying horizontally after its launch, after which it can perform a vertical take-off maneuver in view of the spectators. These maneuvers permit the spectators to share in the excitement of launch and vertical take-off, while being protected from the greater risks associated with vehicle launch and landing at the airstrips. The rocket-powered vehicles may be required to perform various maneuvers proximate the spectators as part of landing, take off, refueling, race completion, or at other portions in the race.

The racecourses 1429 shown in FIGS. 14A and 14B are three-dimensional racecourses similar to racecourse tunnel 122 of FIG. 10, with the addition of the required touch-and-go maneuver in front of the spectators followed by a rocket relight. Racecourses 1429 are formed via racecourse data that may include markers for virtual pylons 1430, one or more racecourse tunnels identifying flight envelopes for the competition, and one or more team/vehicle-specific tunnels within racecourse tunnels that identify flight envelopes for individual vehicles. As shown, the racecourse may also include one or more physical gates 1432. The markers may be fixed or they may be varied from lap to lap, or race to race. The race may include laps around the racecourse; laps from point to point, such as around a track 1434 shown in FIG. 14B formed via one or more virtual pylons and other racecourse data including coordinates for virtual tunnels; laps around various sub-portions of the racecourse; or combinations thereof. The racecourse or portions of it (e.g., virtual track 1434 discussed below along with FIG. 14B) can change from lap to lap or even randomly, which can be an added measure to excite the crowds. Spectators themselves may even be able to play a role in selecting from a matrix of pre-designated virtual tracks in the sky.

In the configuration shown in FIG. 14A for racing configuration 1410, three-dimensional safety zones or safety bubbles 1413 are maintained around each rocket-powered vehicle while competing along the racecourse. The safety bubbles ensure that a safe separation distance is maintained between the rocket-powered vehicles, which is an even more significant concern for the head-to-head racing configurations of space competition 1410. In one configuration, safety rules for the competition will require that each rocket-powered vehicle have a virtual bubble around it according to pre-determined safety criteria. If a pilot maneuvers his rocket-powered vehicle into the bubble of another rocket-powered vehicle, such as from behind during head-to-head racing, then points are deducted from the violating rocket-powered vehicle and/or team. The bubbles can be generated and maintained through navigation data sent from the rocket-powered vehicles and monitored at the spaceport. Optionally, each rocket-powered vehicle may be required to fly within its own virtual tunnel. The vehicle-specific virtual tunnels may be spaced apart a sufficient distance to ensure safe navigation with respect to competitors, but may be located proximate to one another so that all vehicles follow a substantially identical course.

For example, in accordance with the navigational monitoring aspects of the invention discussed along with the description of rocket-powered vehicle 12 in FIGS. 6-8 and the spaceport of FIGS. 4, 5 and 5a, the rocket-powered vehicles of racing competition 1410 will be outfitted position monitoring sensors, such as global positioning system (GPS) equipment, and preferably are outfitted with high precision position monitoring equipment, such as the GPS equipment known as "differential GPS." Each rocket-powered vehicle transmits its real time location to a ground control system, such as via the wireless telemetry to the ground discussed along with FIG. 7 and/or via communications with other rocket-powered vehicles. The rocket-powered vehicle flight system, the ground control system (e.g., mission control 96 shown in FIG. 5A), and other rocket-powered vehicles monitor the position of rocket-powered vehicles on racecourse 1429 and the safety bubbles formed around each rocket-powered vehicle. The safety bubbles may be shown to spectators via televisions 86 shown in FIG. 5A, which may include JUMBOTRON displays, via wireless devices, and/or via other network-enabled devices monitoring the racing competition 1410 over the Internet.

Figure 19:
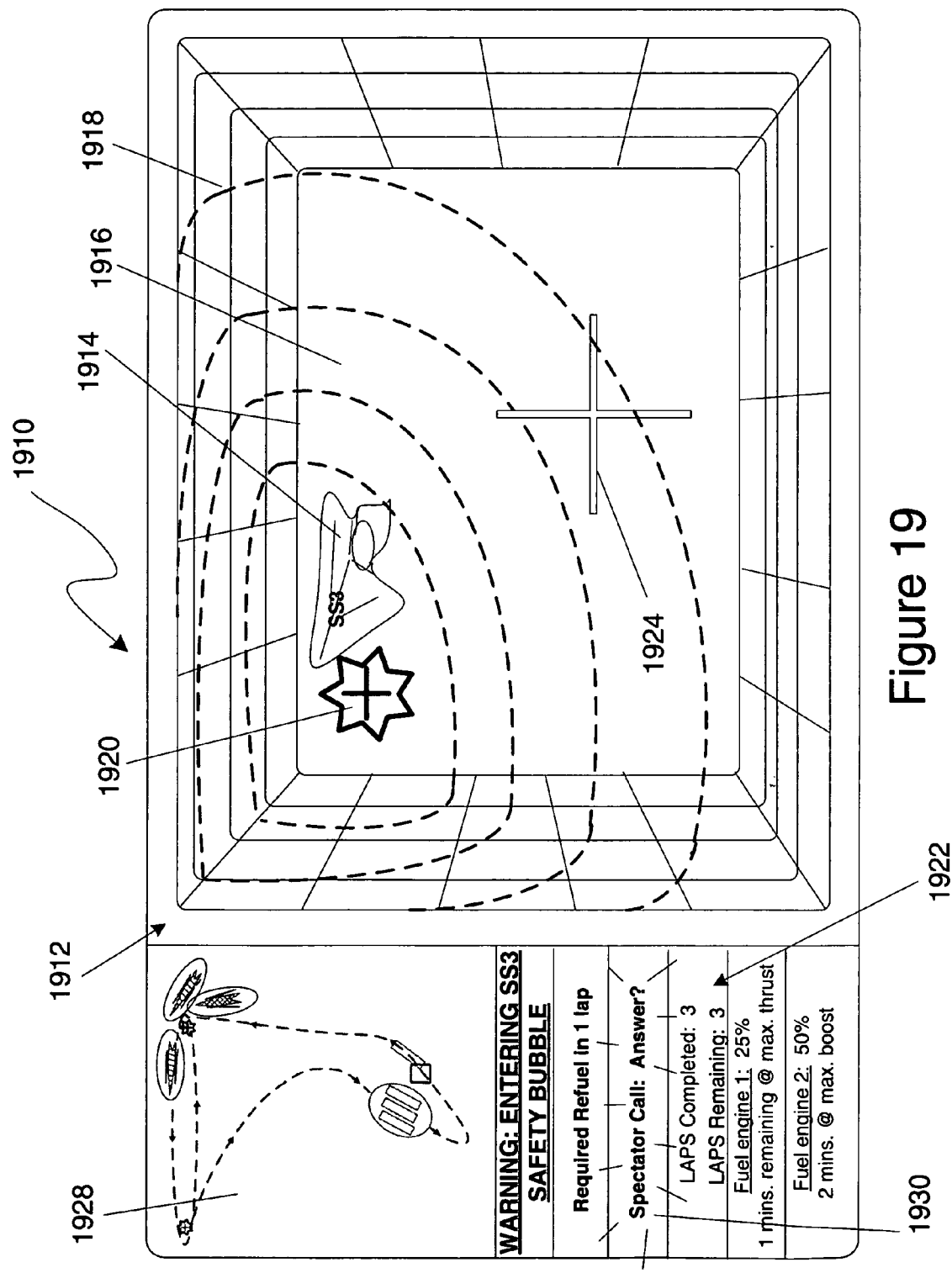
FIG. 19 shows a display of a rocket-powered vehicle for use with the rocket-powered vehicle competitions of FIGS. 14A and 14B.

As discussed further along with FIG. 19, the pilots of each rocket-powered vehicle may be provided with a heads up display that may, in various combinations, display other competitors, the competitor's safety bubbles, the vehicle-specific virtual tunnel within which the vehicle should navigate, the overall racecourse tunnel, virtual pylons, physical data and obstacles. Each pilot preferably receives warnings as they approach bubbles of other aircraft or move out of their vehicle-specific tunnel, which can optionally be integrated into the control functions of the rocket-powered vehicle itself. Race moderators may have the ability to increase or decrease the size of the bubbles to allow closer in clustering of race participants or to provide deliberate separation.

As shown in FIG. 14B, the racecourse 1429 may exist in a three-dimensional plane initially reaching into the sky a height 1436. The racecourse may include one or more tracks 1434, which may have a dimension 1438 in the downstream direction and a dimension 1440 in the cross plane direction. In one configuration, the height 1436 and dimensions 1438 and 1440 may be the same to form a generally circular track. However, the track may have a variety of sizes, shapes and dimensions. In one embodiment, the height 1436 is between one-half and one and a half miles, which should be viewable by spectators via binoculars or another viewing aid, and preferably is about one mile, which is a relatively safe height that may also be viewable by the spectators. In other embodiments, racecourse 1429 and/or track 1434 may expand out to include larger and larger volumes of space beyond one and a half miles, reaching further into the sky vertically, and/or in the crosswise and downstream directions. In addition, the race can extend vertically to sub orbital altitudes, or can circle the earth or even extend to the moon or beyond. Constraints on the racecourse and tracks include performance limitations of the rocket-powered vehicles themselves, and may involve considerations of the ability to bring the race to the spectators through remote display technologies in a way that keeps it exciting and creates a shared sense of close-in participation.

In one configuration of rocket-powered vehicle competition 1410, each rocket-powered vehicle will have a pre-determined maximum quantity of rocket fuel as measured by mass or an estimated engine burn time at a certain thrust. Each rocket-powered vehicle may also be limited to a pre-determined maximum burn time for its rocket engine(s), which may be provided in concert with pre-determined maximum thrust parameters. The pre-determined maximums will be selected to ensure periodic refueling of each rocket-powered vehicle during the competition.

Rapid refueling via team-specific pits may be an option or a requirement for rocket-powered vehicle competition 1410. Rapid refueling can permit long duration races while providing the spectators with a close look at the race teams, which can occur during the actual race as the rocket-powered vehicles are being refueled and serviced. For instance, a quantity of rocket fuel sufficient for a burn time of 4 minutes may be established for the pre-determined maximums, which may permit a rocket-powered vehicle to navigate a single lap of racecourse 1429 in a rapid timeframe if the pilot burns the rocket engine continuously. However, based on this choice, the pilot may need to refuel relatively quickly. A second pilot may strategically choose to proceed at a slower rate that includes gliding and periodically burning the fuel to maintain speed or to boost the rocket-powered vehicle speed when needed. The second pilot may be able to navigate two laps of racecourse 1429 without refueling, but at an overall slower rate than the rate at which the first pilot can complete each lap and undergo rapid refueling therebetween. The pre-determined maximums may be established to ensure each rocket-powered vehicle must refuel at least once during the competition or to ensure each rocket-powered vehicle must alternate between boosting and gliding. It will be up to the individual rocket-powered vehicle pilot to decide how to use the fuel throughout the race to conserve fuel, vary thrust, sustain velocity, taxi, etc. The race may be a collection of boost and glide modes as the pilot works to optimally manage the application of rocket thrust while conserving scarce fuel. After the fuel is expended, the pilot will glide to land the rocket-powered vehicle and undergo a rapid refueling.

In one embodiment of the rocket-powered vehicle competition 1410, each participant may be able to strategically develop his propulsion system to provide a selectively-applied booster engine configuration based on anticipated management of the limited supply of fuel and desired engine performance. Various combinations of rocket engines, types of propellants, and nozzle configurations, including various nozzle sizes, types and styles, may be developed by each team to strategically meet the pre-selected maximums while attempting to maximize rocket-powered vehicle performance. For example, a participant team may develop a rocket-powered vehicle that has one or two primary rocket engines for vertical takeoff, as well as one or more smaller engines that can be selectively ignited and/or strategically controlled for navigating the racecourse.

Figure 14C:
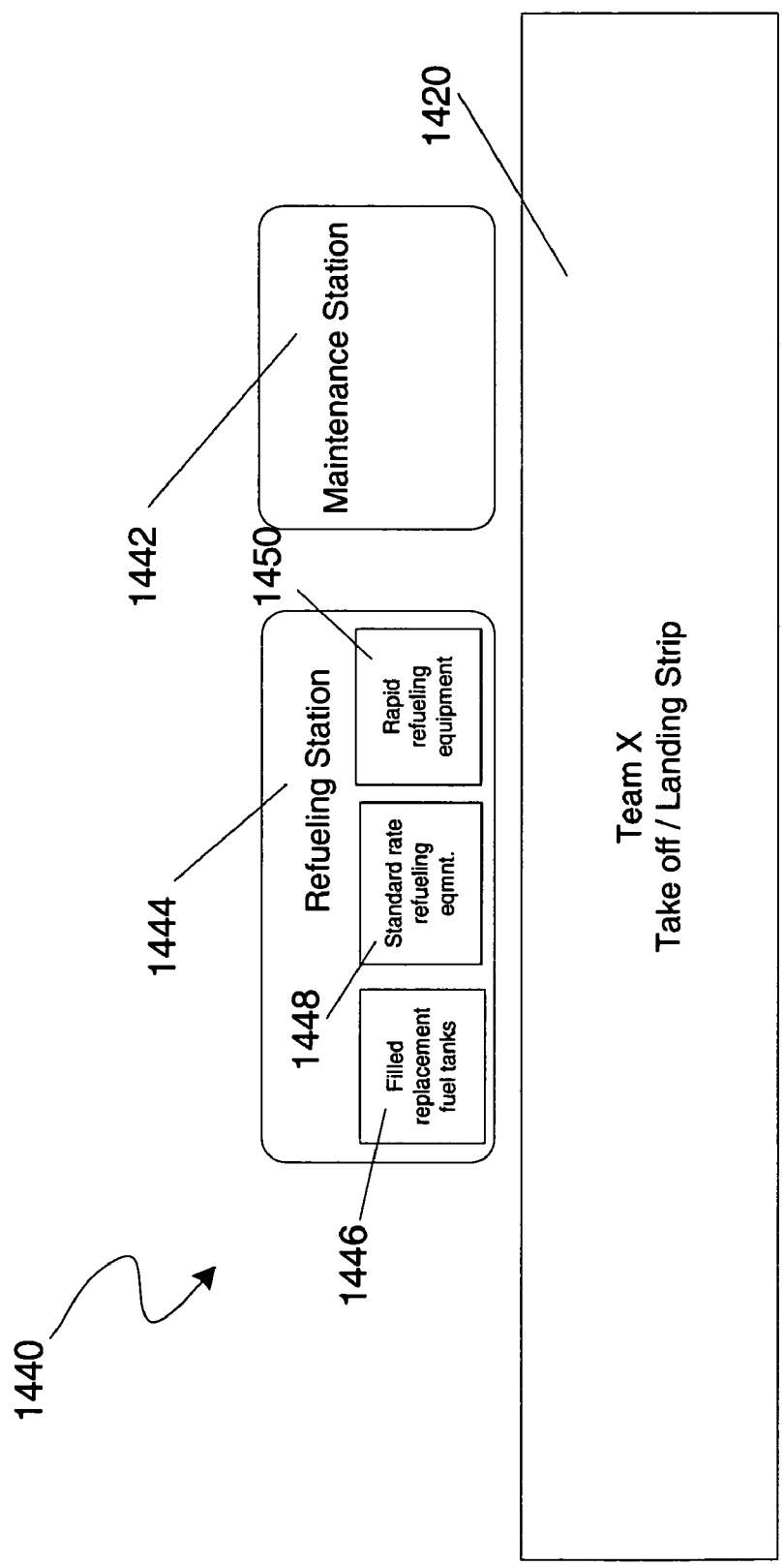
FIG. 14C is a top view diagram of a support station of a spaceport supporting the rocket-powered vehicle competitions of FIGS. 14A and 14B.

FIG. 14C shows an example support station 1440 for a rocket-powered vehicle, which is part of the landing and/or takeoff portion 1420 of the spaceport, and includes one of the airstrips 1420 located therein. If practicable, each team has its own support station and a dedicated airstrip. Preferably, each rocket-powered vehicle has its own airstrip regardless of whether the rocket-powered vehicle's team may sponsor multiple rocket-powered vehicle entrants. The support station includes maintenance station 1442 and refueling 1444. Maintenance station 1442 houses necessary maintenance equipment and supplies for preparing a rocket-powered vehicle for the competition, supporting the rocket-powered vehicle during competition, and servicing the rocket-powered vehicle after the competition. Maintenance station 1442 may also provide a base camp for team personnel who are supporting the competition.

Refueling station 1444 may be proximate the maintenance station for logistical advantages and to provide parallel maintenance and refueling operations during a pit stop of the competition, such as a rapid refueling stop. Alternatively, the refueling station may be separated a safe distance from the maintenance station and other structures to reduce the likelihood of a fuel accident affecting a large number of people.

Refueling station 1444 may include filled replacement fuel tanks 1446, standard rate refueling equipment 1448, and rapid refueling equipment. In a configuration in which the supported rocket-powered vehicle includes removable fuel tanks and/or banks of fuel tanks (discussed below along with an example rocket-powered vehicle shown in FIG. 16), the refueling station has replacement tanks on hand, filled and ready for rapidly transferring to and installing in the supported rocket-powered vehicle during a pit stop. The refueling station also has standard rate refueling equipment for fueling the rocket-powered vehicle during maintenance and race preparations, as well as for fueling the replacement fuel tanks in anticipation of a refueling pit stop. The refueling station also includes rapid refueling equipment, which may provide high-flow rate refueling as needed on an emergency basis, for topping off a rocket-powered vehicle during an unscheduled pit stop, and for refueling fixed tank rocket-powered vehicles. The rapid refueling equipment may also include support equipment for transporting the filled removable fuel tanks to a rocket-powered vehicle and for quickly completing fuel tank replacement procedures.

For fixed tank rocket-powered vehicle configurations, the rapid refueling equipment may include high-flow rate refueling equipment that provides fuel and oxidizer as needed to the tanks at a high-flow rate, which may also be at a high pressure to support the fast operation. In order to avoid potential safety issues that may be associated with high pressure/high velocity refueling, the high-flow rate equipment may have large cross-sectional conduits, which can provide a rapid volumetric flow rate without pumping the fuel at high velocities and/or at high pressures (beyond pressures required to maintained certain fuels and oxidizers in a liquid state). In conjunction with the rapid volumetric flow rate equipment, a corresponding rocket-powered vehicle would preferably have large cross-sectional ports to avoid narrowing the fuel flow and thereby increasing the flow velocity to maintain the rapid volumetric flow rate. The large cross-sectional ports may be in addition to standard fuel ports used for standard refueling procedures.

Figure 16:
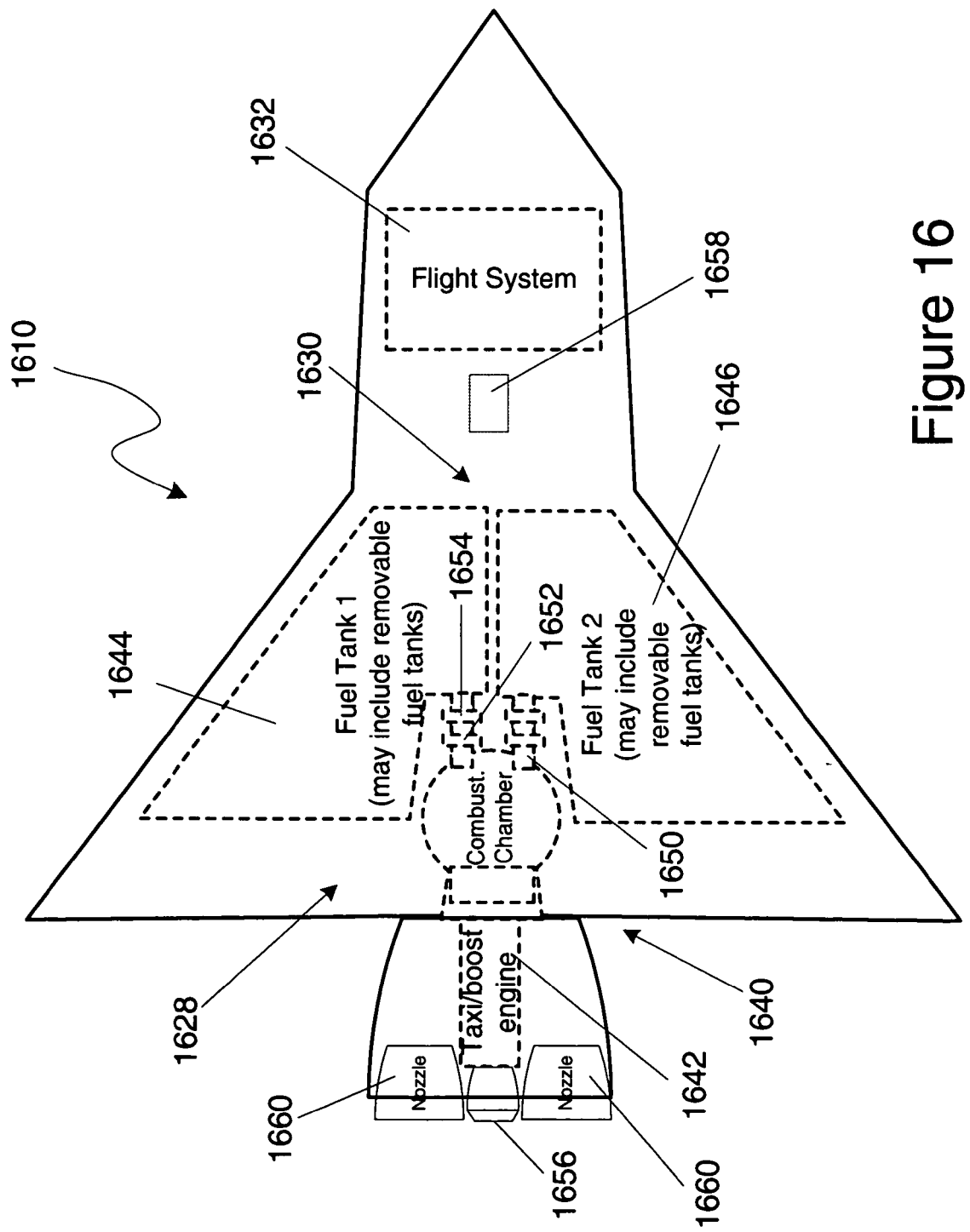
FIG. 16 shows a rocket-powered vehicle according to an embodiment of the invention for use with the rocket-powered vehicle competitions of FIGS. 14A and 14B.

FIG. 16 shows an example rocket-powered vehicle 1610 that may be used to selectively-apply thrust to conserve fuel while providing desired performance characteristics. However, rocket-powered vehicle 1610 may be used to practice other aspects of the invention, including performing methods 50, 150 and 1510 and aspects related to rocket-powered vehicle competitions 10, 110 and 1410. Rocket-powered vehicle 1610 is generally the same as rocket-powered vehicle 12 shown in FIGS. 6-8 except as discussed hereafter. As shown, rocket-powered vehicle 1610 includes a flight system 1632 and propulsion system 1628. The propulsion system includes a primary rocket engine 1640, a secondary rocket engine 1642, and propellant 1630. Rocket-powered vehicle 1610 is a fixed-wing aircraft having horizontal flight functionality and glide functionality similar to conventional jet aircraft, as well as vertical flight functionality as a rocket-powered spacecraft. As an example, rocket-powered vehicle 1610 may be based on the aircraft known as EZ ROCKET made by XCOR AEROSPACE having a place of business in Mojave, Calif., United States of America.

Propellant 1630 may include a variety of rocket fuels, such as an oxidizer (e.g., liquid oxygen, nitrogen tetroxide, nitrous oxide, air, hydrogen peroxide, perchlorate, ammonium perchlorate, etc.) plus a fuel (e.g., light methane, hydrazine-UDMH, kerosene, hydroxy-terminated polybutadiene (HPTB), jet fuel, alcohol, asphalt, special oils, polymer binders, solid rocket fuel, etc.). The fuel is stored in fuel tank 1644 and the oxidizer is stored in another fuel tank 1646. The fuel tanks may be disposed within wings of the rocket-powered vehicle, within the body of the rocket-powered vehicle, or may be carried underneath the rocket-powered vehicle. In one configuration, the fuel tanks may be removable tanks, such as a single tank or a bank of smaller tanks that can be removed and installed on the rocket-powered vehicle relatively quickly. For example, rocket-powered vehicle 1610 may include a pair of storage bays (not shown) into which a bank of tanks 1644 or 1646 may be secured. The rocket-powered vehicle 1610 may also include detachable couplings (not shown) for connecting to the bank of tanks. The detachable couplings may include a variety of clamps with seals (e.g., O-rings) connecting pressurized piping between the bank of tanks and the rocket-powered vehicle propulsion system. In another configuration, the fuel tanks may be fixedly attached or formed within the rocket-powered vehicle, such as being formed within the wings As shown in FIG. 16, the propulsion system further includes piping 1650 for delivering the propellant to primary rocket engine 1640 and secondary rocket engine 1642, as well as valves 1652 and pumps 1654 for controlling the delivery of the propellant to the engines. Preferably, a single pair of fuel tanks 1644 and 1646 feeds both of the engines, which can simplify the design of the rocket-powered vehicle and can assist with permitting the fuel tanks to be rapidly refueled. In addition, the two engines preferably share as many common parts as possible, such as pumps and certain control valves, to avoid unnecessary mass and complexity of the rocket-powered vehicle. However, the rocket-powered vehicle may also include separate tank systems for each engine and other independent components. In addition, each engine may include its own combustion chamber and nozzles. The valves and pumps may be controllable to direct fuel and oxidizer to one combustion chamber or the other, and they may be controllable to direct fuel and oxidizer to both rocket engines depending at the desired level of thrust or fuel consumption. As shown in FIG. 16, secondary rocket engine 1642 may be placed underneath primary rocket engine 1640 to apply thrust along its longitudinal axis. However, the secondary rocket engine may be placed at various locations on the rocket-powered vehicle with respect to the primary rocket and may include a plurality of secondary rocket engines placed at various locations.

In one configuration, the primary rocket engine is used mainly for vertical takeoff while the secondary rocket engine is principally used for maneuvering through the course, maintaining velocity, and boosting velocity. In another configuration, the primary rocket engine has selectively controllable thrust settings and provides both thrust for vertical takeoff and for maneuvering through the course, whereas the secondary rocket engine provides thrust for taxiing along runways. Both engines can be used simultaneously in other configurations to provide a maximum amount of thrust, but at the expense of consuming fuel at the maximum rate. Alternatively, one engine can be run to conserve fuel while still maintaining a reasonable velocity.

In one configuration, options for the engines may be dictated for the race to limit the variety of propulsion systems. For instance, the primary rocket engine may be required to be an on-off engine for all participants, which provides primary thrust for vertical take-off. The secondary rocket engine may be directed to have a finite number of thrust levels, such as low, medium and full thrust. It is understood that a wide variety of rocket engine types with a wide variety of thrust levels and control features may be possible for the rocket-powered vehicles. However, mandating parameters such as the number of rocket engines, the maximum thrust for the engines, thrust levels for the engines, controllability of the engines including directional controls, etc. can significantly add to the amount of strategic considerations for the race participants and can, therefore, add to the excitement for the event. Thrust levels may be controlled by adjusting the flow rate of fuel and oxidizer into the combustion chamber via controlling pumps 1652 and valves 1654 illustrated in FIG. 16.

As desired, one or both engines can have movable nozzles 1660 and thrust vector control mechanisms for maneuvering the rocket-powered vehicle based on the orientation and magnitude of the rocket thrust vector. The selection of engine configurations and controls may be significant for a particular team according to their strategy for winning the race. As noted above, the secondary engine may be adapted to primarily provide boost augmentation rather than to taxi or sustain velocity. For example, once fired, the secondary rocket engine can generate a significant boost and remain ignited until the propellant burns out. In another configuration, the secondary rocket engine can include a pair of small rocket boosters that are fired at various times as selected by the race team and pilots. In another example, the secondary rocket engine can include a bank of small rocket boosters, such as about five boosters. In a further example configuration, the secondary rocket engine can be powered via a solid propellant alone while relying upon atmospheric oxygen to be an oxidizer. However, such a configuration may have limited applicability to low altitude uses at which sufficient oxygen can be obtained when needed.

As further shown in FIG. 16, rocket-powered vehicle 1610 may include nozzle deflectors 1656 on a nozzle of secondary rocket engine 1642 that modify the exit cone from the engine to produce a unique sound. The spectators can use the unique sound to identify the rocket-powered vehicle or its team. Placement of the deflectors on the secondary rocket engine in a configuration in which it acts as a taxi engine can be beneficial for providing the unique sound whenever the rocket-powered vehicle is taxiing and, therefore, is within audible range of the spectators. Alternatively, the nozzle deflectors can be placed on the primary rocket engine 1640, which may be beneficial for providing the unique sound during vertical takeoff. The nozzle deflectors can be used at all times to produce a signature sound for the rocket-powered vehicle and/or its team while that engine is being fired. Alternatively, the nozzle deflectors can be selectively activated and deactivated to provide the signature sound as desired, such as whenever the rocket-powered vehicle is within audible range of the spectators.

As further shown in FIG. 16, rocket-powered vehicle 1610 may include a sound generator 1658, such as a conventional horn or siren, which can augment the sound generation capabilities of nozzle deflectors 1656 or provide an alternative sound generation mechanism compared with the nozzle deflectors 1656. The sound generator may augment the sound signature of the deflector nozzles (e.g., provide a similar sound to that generated via the nozzle deflectors), play a previously-recorded version of the unique sound, or even amplify the sounds generated via nozzle deflectors previously considered or may be relied upon alone to provide the sound signature for the rocket-powered vehicle. The flight system may be configured to activate the sound generator and/or the nozzle deflectors on command from the pilot or another member of the team. In addition, the flight system may be configured to automatically activate it below a certain altitude or whenever the flight system receives a signal or other indication that it is located proximate the spaceport.

Referring now to FIGS. 17 and 18A-C, a rocket-powered vehicle 1710 according to another embodiment of the invention is shown. Rocket-powered vehicle 1710 generally includes the aspects and features of rocket-powered vehicle 1610, except as discussed hereafter. As shown, rocket-powered vehicle 1710 includes a plume visualization system 1712, which enhances the visibility of the rocket plume. In addition, the plume visualization system may mark the plume from one or more of the rocket engine in a persistent manner such that the plume remains viewable for a period of time after the rocket-powered vehicle creates it. For instance, the plume may mark the trail of a rocket-powered vehicle for a period between 5 seconds to 1 minute, which permits spectators to easily follow the rocket-powered vehicles along the directly viewable portions of the racecourse. In one configuration, each rocket-powered vehicle marks its plume in manner specific to that rocket-powered vehicle or racing team, such that the plume identifies the rocket-powered vehicle and its path. For instance, each rocket-powered vehicle or team may have one or more colors associated with it. Thus, each rocket-powered vehicle may have a visual signature via its plume, and it may also have a sound signature as discussed above along with FIG. 16. Accordingly, spectators can be provided with multiple cues to help them keep track of the fast-paced race occurring overhead amid the excitement of the contest.

Figure 17:
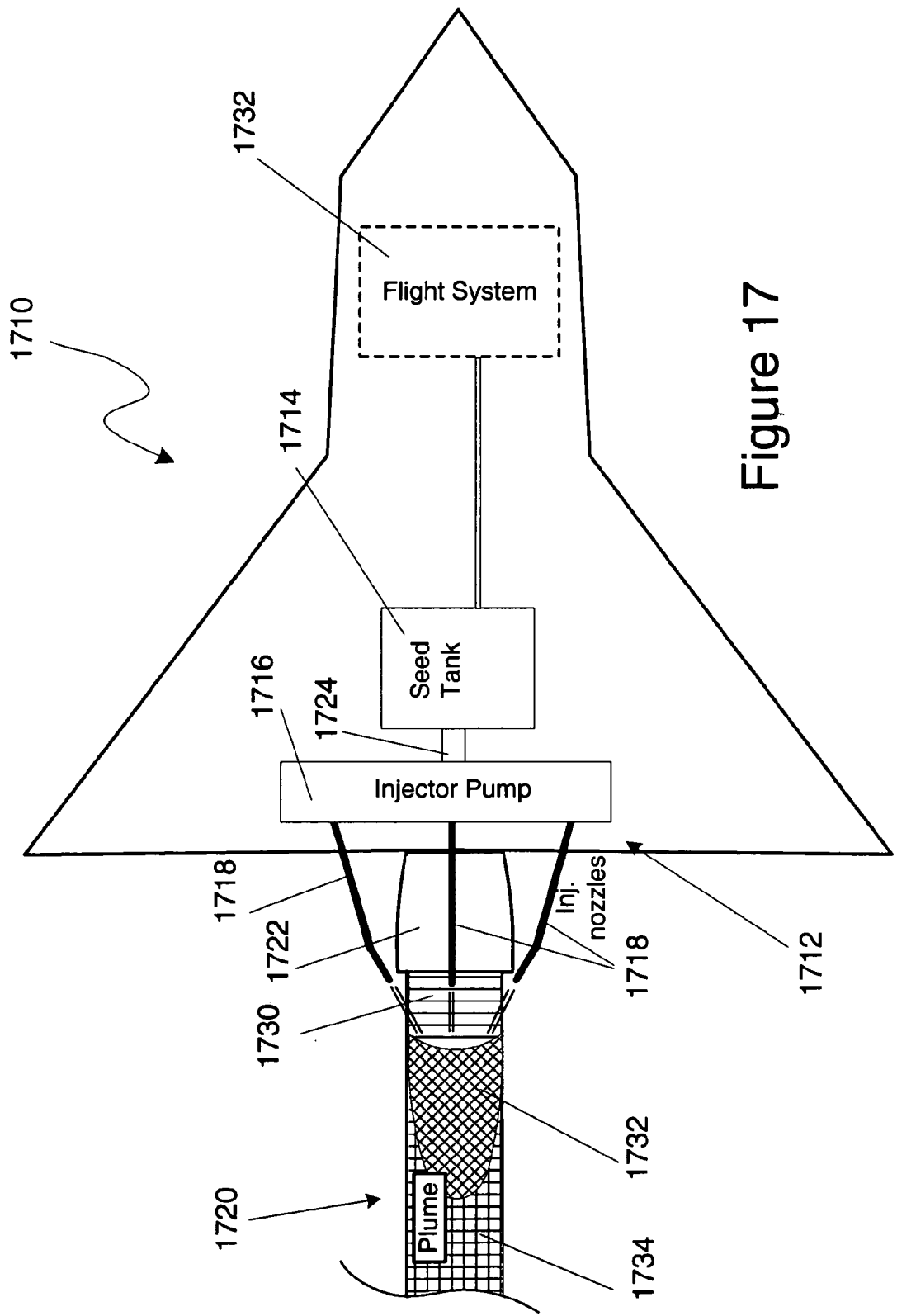
FIG. 17 shows another rocket-powered vehicle according to an embodiment of the invention for use with the rocket-powered vehicle competitions of FIGS. 14A and 14B.
Figure 18A:
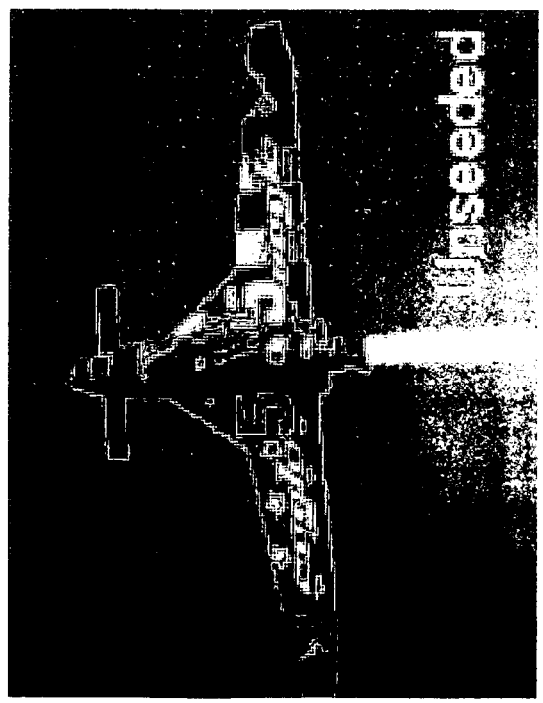
FIGS. 18A, 18B and 18C show the rocket-powered vehicle of FIG. 17 with and without seeding its rocket plume.
Figure 18B:
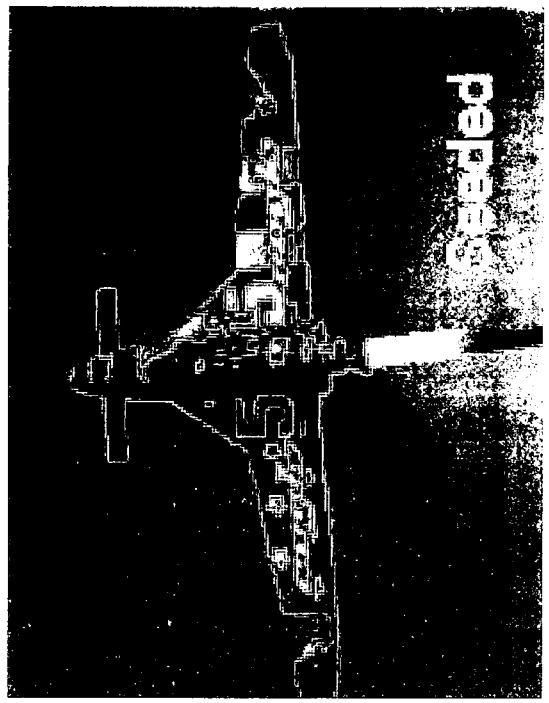
Figure 18C:
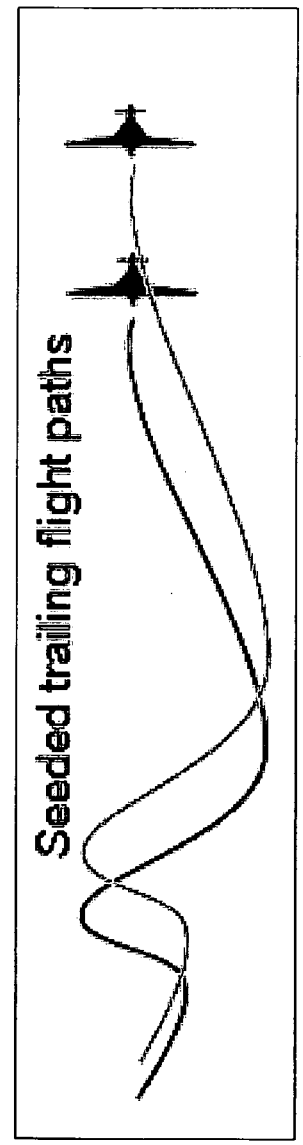

As shown in FIG. 17, according to one embodiment of the invention, plume visualization system 1712 includes a seed tank 1714 in communication with the rocket-powered vehicle flight system 1732, an injector pump system 1716, and injector nozzles 1718. The plume visualization system marks one or more plumes from the rocket-powered vehicle via injecting plume seed containing chemicals into the hot rocket plume 1720 as it exits one or more rocket nozzles 1722 of the rocket engine. Seed tank 1714 retains the chemicals, which may be in a liquid form conducive for pressurized spraying. Injector pump 1716 receives the chemicals from the seed tank via a conduit 1724 between the two. The conduit may include components specific to the type of chemical used, such as a mixing tank for mixing one or more chemicals to form the chemical or place it in an active form, and/or for placing the chemicals in a mixture conducive for spraying, etc. The conduit may also include valves and other controllable devices for controlling the preparation and flow of the chemicals to the injector pump. The injector pump delivers the chemical to injector nozzles 1718, which spray it directly into the plume as it exits the rocket engine nozzle.

The visual identifier may be generated via a chemical reaction that occurs in response to the heat of the plume, which causes the chemicals to burn or radiate a particular color. In one configuration, the intensity of the color may vary according the thrust level of the engine. This may be accomplished by providing temperature-sensitive chemicals to the plume that cause radiant light energy at different temperatures, thereby displaying to spectators a piecewise spectrum of colors that vary in wavelength according to thrust level. For instance, as shown in FIG. 17, a first portion of the plume 1730 emits the natural colors of combustion for the particular propellant being burned, such as kerosene or alcohol. A second portion of the plume 1732, which is located just downstream from entry of the chemicals, emits colors based on initial reactions with the chemicals injected into the plume, such as the burning of metal salts or pyrotechnic chemicals. A third portion of the plume 1734 further downstream from the second portion emits different colors, which may be produced by cooling combustion products, continuing reactions such as longer duration pyrotechnic reactions, continued reactions between chemicals and the atmosphere, etc. Preferably, however, the first and second portions include common colors identified with a particular rocket-powered vehicle or team, such as various blues for one team or various reds for another team.

In another configuration, the intensity of color may be deliberately varied based on the flow rate of plume seed sprayed from the injector nozzles. For example, an intense color may deliberately be provided during vertical take off or as a rocket-powered vehicle crosses a finish line marker. The pilot may be able to control the plume visualization system via controls of the flight system. Alternatively, the plume visualization system may be controlled remotely via ground control communications to the flight system. In another configuration, the flight system may be programmed to control automatically the plume visualization system according to location of the rocket-powered vehicle.

The chemicals of the plume seed may include one or metal salts. When the metal salts are exposed to the flame of the rocket plume, they give off light characteristic of the metal. The metal ions combine with electrons in the flame, which are raised to excited states because of the high flame temperature. Upon returning to their ground state, they give off energy in form of light (a line spectrum) that is characteristic of that metal. Several metal salts give off a characteristic color visible to the human eye as is demonstrated by the alkali metals and a few other elements. Examples of chemicals that may be used various combinations include sodium, potassium, aluminum chloride, boric acid, calcium chloride, cobalt chloride, copper chloride, lithium chloride, magnesium chloride, manganese chloride, sodium chloride, strontium chloride. Pyrotechnic chemicals commonly used in fireworks displays may used as well, including antimony trisulfide, ammonium perchlorate, ammonium chloride, aluminum, and more.

In an alternative configuration (not shown), rocket-powered vehicle 1710 includes a non-reactive smoke generator, which provides non-reactive identification smoke when the rocket engine is not being fired. The non-reactive smoke generator preferably turns off when the rocket engine is being fired to capture the natural combustion colors, such as the yellow color of burning kerosene or the violet/blue of burning alcohol. When the rocket engine turns off and the vehicle is gliding, the smoke generator may emit identification smoke to demonstrate the rocket-powered vehicle's glide path. Thus, rocket engine combustion highlights the rocket-powered vehicle's flight path when powered, and the non-reactive smoke generator highlights its flight path when gliding. In another configuration, a plume visualization system may be used during rocket firing to identify the plume of the particular rocket-powered vehicle or team, and a non-reactive smoke generator may be used by the same rocket-powered vehicle while gliding to produce identification smoke that generally matches the colors produced by the plume visualization system. Thus, regardless of the firing status of rocket engines, a visual signature may be constantly provided that highlights the rocket-powered vehicle's flight path.

Referring now to FIG. 19, a heads up display 1910 is shown as part of a rocket-powered vehicle console in a rocket-powered vehicle, rocket-powered vehicle 1610 shown in FIG. 16, in accordance with embodiments of the invention. Heads up display 1912 may be shown on a rugged display device 1912, such as the rugged displays currently manufactured according to United States military specifications for use in military vehicles. The display can show a wide variety of information to the pilot in a variety of views including vehicle control information, racing information, maintenance information, navigation information, etc. The display device may be connected to flight system 1632 and/or other systems and flight computers. FIG. 19 shows an example view of display 1910 during a racing competition, such as competition 1410 of FIGS. 14A and 14B. As illustrated, the display may show, in various combinations, other competitors 1914; the competitor's safety bubbles 1916; the vehicle-specific virtual tunnel within which the vehicle should navigate (not shown); the overall racecourse tunnel 1918; virtual pylons 1920; physical data 1914, such as an actual view of a competitor, obstacles, or other physical objects; the location of the pilot's vehicle 1924; and competition information 1922. The information shown may be generated by the flight computer based on information received from flight control (e.g., status of competitors), pre-loaded race information (e.g., racecourse tunnel), navigation information received from flight control (e.g., your current location), navigation information from various sensors (e.g., GPS receivers), vehicle sensors (e.g., fuel level sensors, cameras, etc.), etc. The display may also show an overall view of the racecourse 1928 showing the status of other participants and the current location of the pilot's vehicle in relation thereto.

The competition information 1922 may include warnings 1926, such as a warning when a pilot approaches or enters bubbles of other vehicles, moves out of their vehicle-specific tunnel, moves out of the racecourse tunnel, or misses a virtual pylon or other waypoint of the race, etc. The warning can flash red on the display for certain warnings. In addition, tactile and audible warnings can be provided to the pilot, such as vibrating a control handle the pilot is using or playing a warning sound. Similarly, positive indications (not shown) can be provided when the vehicle successfully hits a waypoint, such as navigating around a virtual pylon or flying through a virtual gate. For instance, a green light or message can flash on the display to show the vehicle successfully passed a virtual pylon. In addition, tactile or audible indications can also be provided for successfully completing the task. The overall view 1928 may also include warnings and positive visual indicators, such as flashing in red a missed virtual pylon or flashing the same pylon in green when the pilot successfully navigates around it.

Figure 20:
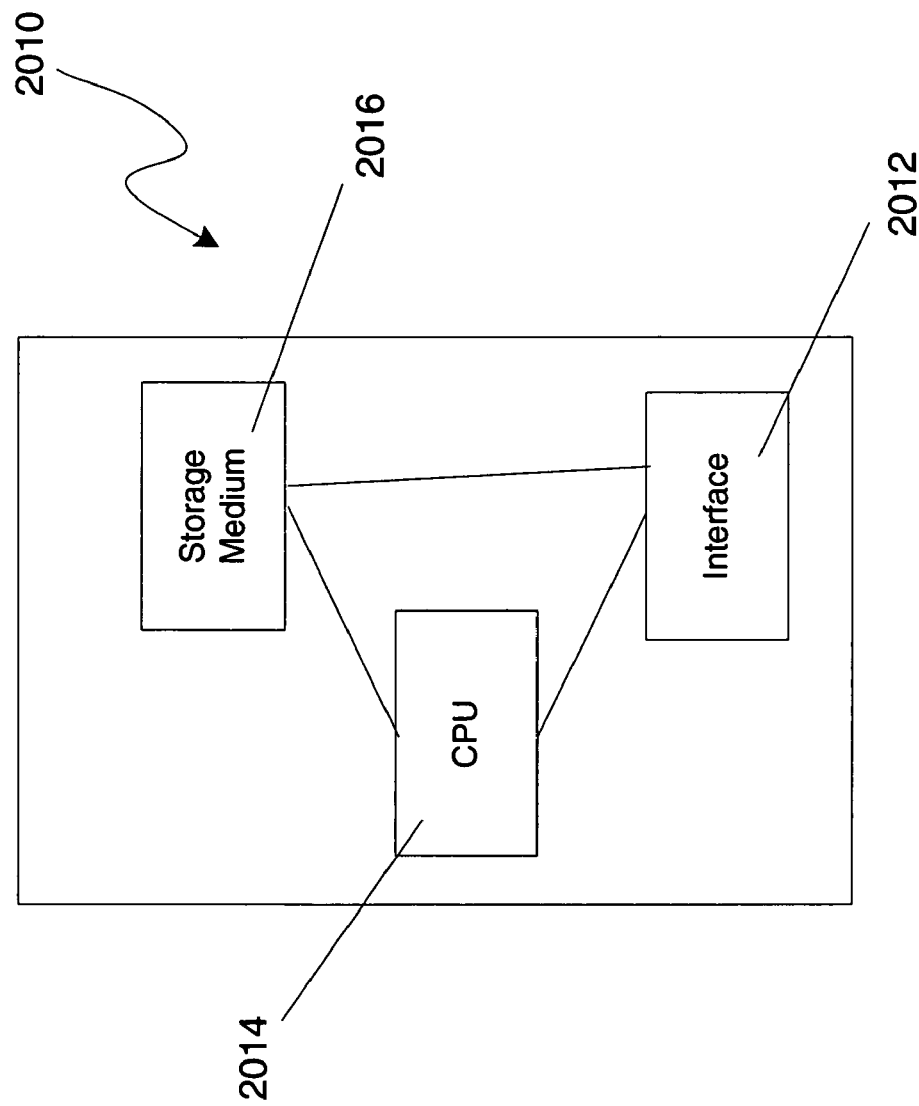
FIG. 20 is a diagram of spectator server for use with the rocket-powered vehicle competitions of FIGS. 14A and 14B according to an embodiment of the invention.
Figure 21:
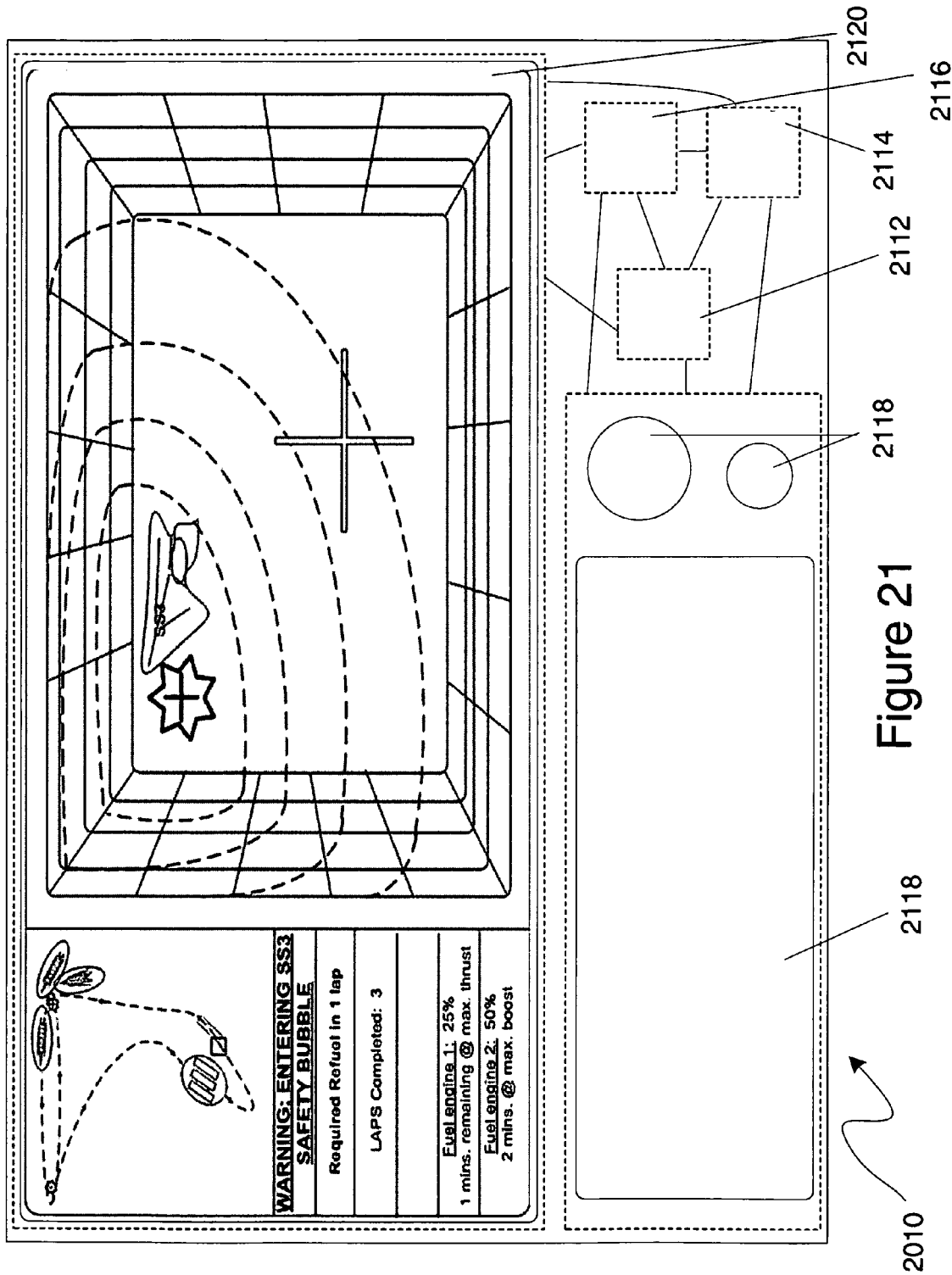
FIG. 21 shows a spectator computing device for use with the rocket-powered vehicle competitions of FIGS. 14A and 14B according to an embodiment of the invention.

Referring now to FIGS. 20 and 21, a spectator server 2010 (FIG. 20) and a spectator computing device 2110 (FIG. 21) are generally shown according to embodiments of the invention. The spectator server 2010 generally includes the same aspects as telemetry computer 87 discussed above along with FIG. 13, except as described hereafter. The spectator server may be a separate entity from the telemetry computer, it may be a separate logical entity from the spectator server that resides on the same computer or group of computers, or it may be a completely separate entity from the telemetry computer that may or may not be in communication with the telemetry computer. The spectator server is a computing entity that interacts with spectators to permit them to participate interactively in a racing competition, such as competitions 10, 110 and 1410. The interactivity may include providing status and other race related information to spectators, such as is described along with the description for telemetry computer 87. In addition, the spectator computer may permit spectators to interact directly with race participants and to be involved with aspects of the race itself, such as voting on racecourse options. In addition, the spectator computer may provide gaming information to spectators or other people to permit a variety of gaming options, such as virtual racing against actual participants. Spectator computing device is a device that spectators or other interested people may use to interact with the spectator computer for gaming purposes or other racing purposes. Spectator computing device may be specifically-designed device for the racing competition. Preferably, however, spectator computing device is a conventional computing device, such as a personal digital assistant or a laptop computer.

As shown in FIG. 20, spectator server includes an interface 2012, a CPU 2014 and a storage medium 2016, such as a hard drive, a network accessible storage location, local memory, etc. The interface may include one or more interfaces, such as a wired and wireless network interfaces. Storage medium 2016 stores software for instructing the CPU to perform various steps such as providing updated racing information to spectator computing devices, hosting racing games based on race information, and permitting spectators to interact with race participants. In addition, the spectator server may act as web site to permit spectator computing device or other devices to have real time participation in race events.

As shown in FIG. 21, spectator computing device 2110 generally includes an interface 2112, a CPU 2114 and a storage medium 2116, such as a hard drive, a network accessible storage location, local memory, etc., input devices 2118, and a display 2120. The interface may include one or more interfaces, such as a wired and wireless network interfaces. Storage medium 2116 stores software for instructing the CPU to perform various steps such as receiving updated racing information from the spectator server and/or the telemetry computer, playing racing games based on the race information, and interacting with race participants. The storage medium may have racing software stored locally thereon, with can permit the user to race a virtual rocket-powered vehicle at any time regardless of the device's connectivity status with other computers. When the device is connected to other computers, however, the user may choose to race his virtual vehicle as part of actual ongoing races via data from the spectator server and/or against other virtual competitors. Optionally, the spectator server may host the gaming software and the spectator computing device may interact with the spectator server for racing games.

Browser-based software and/or racing specific software stored on the spectator computing device may allow spectators to accomplish a wide variety of functions related to rocket-powered vehicle races, which may be selectable in an interactive manner to provide the user with a hands-on experience. In one configuration, a spectator can select a soft key that brings up an actual racecourse and shows a virtual vehicle thereon for the spectator to race. The display would show computer generated images depicting the actual rocket racers, driven by differential GPS or the equivalent, so that the placement of the computer generated vehicles on the screen matches that which is taking place in the real live race. If the user clicks on a specific vehicle, the spectator can then select from a number of functions that might include listening in on the cockpit conversation and other audibles, viewing either a virtual instrument cluster driven with real-time telemetry data, or viewing a live video feed of the actual instrument cluster. Other options might allow the spectator to stream a video of the pilot's face, or stream a variety of video feed from a number of different cameras or telemetry stream from various instrumentation suites installed on the rocket vehicles. The spectator can bring up multiple pilots on the screen and pit one against the other.

In one configuration, operated under stringent safety protocol, a spectator using the computing device can compete via the spectator server for the opportunity to speak with a pilot during the race. Optionally, with safety being a primary concern, spectators can even compete for the opportunity to ignite remotely a rocket engine boost from their laptop computer by hitting a specific button during a pre-selected timeframe and after providing the winning username and password. Thus, spectators could actually and virtually participate in a rocket-powered vehicle competition.

While the present invention has been described in connection with the illustrated embodiments, it may be appreciated and understood that modifications may be made without departing from the true spirit and scope of the invention. In particular, the invention may apply to various types of racing competitions, including races between vehicles on land, on water, in the air, and/or in outer space. In addition, the invention may apply to manned vehicles (human occupied) and to unmanned vehicles, such as remotely controlled vehicles.

We claim:

1. A method for racing rocket-powered vehicles against one another, the method comprising:
   providing race criteria to a group of racing participants, each racing participant having a rocket-powered vehicle, the race criteria identifying a race course and establishing a winner of a race as being the rocket-powered vehicle that is the first to complete the race course, the race criteria comprising three-dimensional safety data for preventing collisions between competing rocket-powered vehicles, the three dimensional safety data comprising a first vehicle-specific tunnel for the first rocket-powered vehicle and a second vehicle-specific tunnel for the second rocket-powered vehicle;

launching into a first aerial flight path a first rocket-powered vehicle of the group of racing participates;

launching into a second aerial flight path a second rocket-powered vehicle of the group of racing participants; and racing the first rocket-powered vehicle against the second rocket-powered vehicle, the first rocket-powered vehicle and the second rocket-powered vehicles maintaining a safe distance between each other according to the three-dimensional safety data by staying within their vehicle-specific tunnel.

2. The method of claim 1, further comprising:

maneuvering the first rocket-powered vehicle proximate a group of spectators and, while proximate the group of spectators, performing a pre-determined maneuver; and maneuvering the second rocket-powered vehicle proximate the group of spectators and, while proximate the group of spectators, performing a pre-determined maneuver.

3. The method of claim 1, further comprising providing a first visual identifier marking the flight path of the first rocket-powered vehicle.

4. The method of claim 3, wherein the step of providing a first visual identifier comprises emitting a non-reactive smoke from the first rocket-powered vehicle.

5. The method of claim 3, wherein the step of providing a first visual identifier comprises injecting chemicals into a plume exiting a rocket engine of the first rocket-powered vehicle.

6. The method of claim 3, further comprising providing a second visual identifier marking the flight path of the second rocket-powered vehicle, the second visual identifier having a different visual appearance than the first visual identifier to permit viewers to identify each of the rocket-powered vehicles based on the different visual appearance of the visual identifiers.

7. The method of claim 1, further comprising the first rocket-powered vehicle producing a first audible identifier while flying, the first audible identifier identifying the first rocket-powered vehicle to a first listener hearing the first audible identifier.

8. The method of claim 7, wherein the step of the first rocket-powered vehicle producing a first audible identifier while flying comprises the first rocket-powered vehicle emitting the audible identifier from a sound generator.

9. The method of claim 7, wherein the step of the first rocket-powered vehicle producing a first audible identifier while flying comprises the first rocket-powered vehicle modifying an exit cone from a rocket engine.

10. The method of claim 9, further comprising the second rocket-powered vehicle producing a second audible identifier while flying, the second audible identifier identifying the second rocket-powered vehicle to a second listener hearing the second audible identifier, the second audible having different sound properties than the first audible identifier to permit listeners to identify each one of the rocket-powered vehicles based on the sound of its audible identifier.

11. The method of claim 1, wherein the race criteria includes requiring each rocket-powered vehicle competing in the race to perform a refueling operation and the step of racing comprises:

the first rocket-powered vehicle performing a first refueling operation; and the second rocket-powered vehicle performing a second refueling operation.

12. The method of claim 11, wherein the step of the first rocket-powered vehicle performing a first refueling operation comprises replacing a first set of partially expended fuel tanks on the first rocket-powered vehicle with a refueled set of fuel tanks.

13. The method of claim 1, wherein the race criteria comprises establishing a maximum quantity of rocket fuel for each rocket-powered vehicle.

14. The method of claim 1, wherein the maximum quantity of rocket fuel is insufficient for each of the rocket-powered vehicles to complete a lap of the race without periodically conserving rocket fuel and the step of racing comprises:

the first rocket-powered vehicle alternating between gliding and applying power to its propulsion system while navigating the race course; and the second rocket-powered vehicle alternating between gliding and applying power to its propulsion system while navigating the race course.

15. The method of claim 1, wherein the three-dimensional safety data comprises a three-dimensional safety bubble around each one of the competing rocket-powered vehicles and the step of maintaining a safe distance comprises the first and second rocket-powered vehicles avoiding overlapping their safety bubbles.

16. The method of claim 1 further comprising:

providing a heads up display in the first rocket-powered vehicle, the heads up display comprising:

a three-dimensional view of a racecourse tunnel based on the race course identified in the race criteria; and a location identifier showing the current location of the first rocket-powered vehicle in the racecourse tunnel.

17. The method of claim 1, further comprising enabling communication between a spectator and a pilot of the first rocket-powered vehicle.

18. The method of claim 1, further comprising providing racing data in real-time to a spectator to permit the spectator to compete with the first and second rocket-powered vehicles using a virtual rocket-powered vehicle.

19. The method of claim 1, wherein the step of racing comprises simultaneously racing the first rocket-powered vehicle against the second rocket-powered vehicle.

20. A method for racing rocket-powered vehicles against one another, the method comprising:

providing race criteria to a group of racing participates, each racing participant having a rocket-powered vehicle, the race criteria identifying a race course and establishing a winner of a race as being the rocket-powered vehicle that is the first to complete the race course;

launching into a first aerial flight path a first rocket-powered vehicle of the group of racing participants, the first rocket-powered vehicle producing a first audible identifier by modifying an exit cone from a rocket engine while flying, the first audible identifier identifying the first rocket-powered vehicle to a first listener hearing the first audible identifier;

launching into a second aerial flight path a second rocket-powered vehicle of the group of racing participants; and racing the first rocket-powered vehicle against the second rocket-powered vehicle.

21. A method for racing rocket-powered vehicles against one another, the method comprising:

proving race criteria to a group of racing participants, each racing participant having a rocket-powered vehicle, the race criteria identifying a race course and establishing a winner of a race as being the rocket-powered vehicle that is the first to compete the race course;

providing a heads up display in the first rocket-powered vehicle, the heads up display comprising a three dimensional view of a racecourse tunnel based on the race course identified in the race criteria and a location identifier showing the current location of the first rocket-powered vehicle in the racecourse tunnel;

launching into a first aerial flight path the first rocket-powered vehicle of the group of racing participants;

launching into a first aerial flight path the first rocket-powered vehicle of the group of racing participants;

launching into a second aerial flight path the second rocket-powered vehicle of the group of racing participants; and racing the first rocket-powered vehicle against the second rocket-powered vehicle.

* * * * *

UNITED STATES PATENT AND TRADEMARK OFFICE
CERTIFICATE OF CORRECTION

PATENT NO.        : 7,287,722 B2                                                    Page 1 of 1
APPLICATION NO. : 11/240638
DATED             : October 30, 2007
INVENTOR(S)       : Peter H. Diamandis, Granger B. Whitelaw and Michael R. D'Angelo It is certified that error appears in the above-identified patent and that said Letters Patent is hereby corrected as shown below:

Column 31, Line 8: Change "proving" to --providing--

Column 31, Line 12: Change "compete" to --complete--

Column 32, Lines 7-8: Delete "launching into a first aerial flight path the first rocket-powered vehicle of the group of racing participants;"

Signed and Sealed this

Tenth Day of June, 2008

JON W. DUDAS
*Director of the United States Patent and Trademark Office*